US008788928B2

(12) United States Patent
McColl et al.

(10) Patent No.: US 8,788,928 B2
(45) Date of Patent: Jul. 22, 2014

(54) SYSTEM AND METHODOLOGY FOR DEVELOPMENT OF STREAM PROCESSING APPLICATIONS UTILIZING SPREADSHEET INTERFACE

(75) Inventors: William Finlay McColl, Palo Alto, CA (US); Antony Azio Faustini, Pleasanton, CA (US)

(73) Assignee: Clandscale, Inc., San Mateo, CA (US)

( * ) Notice: Subject to any disclaimer, the term of this patent is extended or adjusted under 35 U.S.C. 154(b) by 574 days.

(21) Appl. No.: 12/833,229

(22) Filed: Jul. 9, 2010

(65) Prior Publication Data
US 2011/0016379 A1 Jan. 20, 2011

Related U.S. Application Data

(60) Provisional application No. 61/225,871, filed on Jul. 15, 2009.

(51) Int. Cl.
*G06F 17/00* (2006.01)
(52) U.S. Cl.
USPC .......................................................... 715/219
(58) Field of Classification Search
USPC .......................................................... 715/219
See application file for complete search history.

(56) References Cited

U.S. PATENT DOCUMENTS

| 5,926,822 | A | 7/1999 | Garman | |
|---|---|---|---|---|
| 7,047,484 | B1 * | 5/2006 | Becker et al. | 715/201 |
| 7,069,499 | B1 | 6/2006 | McGarry | |
| 2004/0237045 | A1 * | 11/2004 | Meltzer | 715/530 |
| 2007/0073421 | A1 * | 3/2007 | Adra | 700/36 |
| 2007/0294665 | A1 * | 12/2007 | Papakipos et al. | 717/119 |
| 2008/0016436 | A1 * | 1/2008 | Liu et al. | 715/212 |
| 2008/0016440 | A1 * | 1/2008 | Liu et al. | 715/700 |
| 2008/0080718 | A1 * | 4/2008 | Meijer et al. | 380/282 |
| 2008/0134158 | A1 * | 6/2008 | Salz et al. | 717/148 |
| 2010/0057831 | A1 | 3/2010 | Williamson | |

OTHER PUBLICATIONS

"A Spreadsheet Toolkit for Streaming Sensor Data," Seth et al., SenSys, 2005.*
"A Spreadsheet Approach to Programming and Managing Sensor Networks," Woo et al., IPSN, 2006.*

* cited by examiner

*Primary Examiner* — Doug Hutton, Jr.
*Assistant Examiner* — Andrew McIntosh
(74) *Attorney, Agent, or Firm* — G. Mack Riddle

(57) ABSTRACT

A system and methodology for data processing combining stream processing and spreadsheet computation comprises: one or more Cloudscale Stream Processors (CSPs), a Cloudscale-enabled spreadsheet (including a plug-in module), a web services architecture, and one or more data sources. Each CSP takes a set of streams of input data and outputs a set of streams of data. Each stream is a time-ordered stream of files which when concatenated together comprise the stream. The Cloudscale-enabled spreadsheet is includes a plug in module that operates in conjunction with a spreadsheet program and one or more stream processors. The Cloudscale-enabled spreadsheet provides tools and technologies for user authentication, stream discovery, data source extraction and new stream design. It includes features for design of new stream processors, as well as features for checking and validation, cycle and synchronization controls for stream processors and spreadsheets.

23 Claims, 5 Drawing Sheets

SYSTEM AND METHODOLOGY FOR DEVELOPMENT OF STREAM PROCESSING APPLICATIONS UTILIZING SPREADSHEET INTERFACE

CROSS REFERENCE TO RELATED APPLICATIONS

The present application is related to and claims the benefit of priority of the following commonly-owned, presently-pending provisional application(s): application Ser. No. 61/225,871, filed Jul. 15, 2009, entitled "System and Methodology for Data Processing Combining Stream Processing and Spreadsheet Computation", of which the present application is a non-provisional application thereof. The present application is related to the following commonly-owned, presently-pending application(s): application Ser. No. 12/343,215, filed Dec. 23, 2008, entitled "System and Methodology for Parallel Stream Processing". The disclosure of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to the analysis and transformation of information in data processing environments and, more particularly, to systems and methodologies for analyzing, filtering, enhancing and processing streams of data, including live time-ordered data streams, stored time-ordered data streams, and unordered tables of data.

2. Description of the Background Art

Stream processing is concerned with filtering, enriching and enhancing continuous data streams. In order to detect opportunities and threats as early as possible, stream processing systems often need to analyze complex, fast moving, heterogeneous streams of data in real-time. In many cases, they also need to be able to rapidly process historical streams. For example, the ability to rapidly process and analyze historical streams of data is useful in refining trading strategies in the financial services sector. Stream processing software and systems need to run continuously, providing analytics, statistics, filtering, inference, deduction, connection, pattern matching, tracking and tracing.

Stream processing is complementary to databases, data warehousing, data mining, and search engines. The emphasis in stream processing is on continuous time-based information, and on continuous time-critical analysis. In stream processing, one is often looking to pinpoint a rare and important opportunity or threat, without drowning in the relentless flow of data that is typically received by most users and organizations.

Processing of real-time and historical data streams is a critical component of information technology solutions in many application areas, including the following:

Applications in which continuous live data streams from people, sensors, systems and networks are automatically monitored, filtered, analyzed, enhanced and enriched in real-time.

Systems where continuous analytics on massive volumes of real-time data enable businesses and financial services organizations to intelligently discover and immediately respond to opportunities and threats, manage risk, ensure compliance, and deliver the best possible personalized customer experience at all times.

Solutions wherein continuous inference on semantic graphs allows intelligent real-time discovery of deep and important connections within live data streams.

Applications involving continuous real-time analysis of streams of data from networked wireless sensors, such as those that will enable a new intelligent, secure, optimized and highly energy-efficient infrastructure—a new generation of smart buildings, homes, factories, utilities, energy networks, IT systems, data centers, networks and other equipment, each with always-on energy saving, intrusion prevention, and predictive maintenance capabilities.

Solutions utilizing continuous real-time intelligent tracking and tracing (GPS, RFID) enabling powerful new location-based services to be launched, theft and counterfeiting to be reduced, and transportation and distribution to be optimized.

The following is a list of specific application areas that may involve stream processing, although it is by no means a complete list:

Business (Dynamic Pricing, Mobile Advertising, Customer Experience Management, Supply Chain, Logistics, Marketing Intelligence, Personalized Advertising, Risk Management, Compliance, Counterfeit Prevention).

Web and Telecommunications (Marketplaces, Online Games, Social Networks, Personalized Newsfeeds, Semantic Web, Virtual Worlds, Location-Based Services, Fraud Prevention).

Government (Homeland Security, Intelligence, Defense, Compliance).

Financial Services, Banking and Insurance (Algorithmic Trading, Risk Management, Compliance Tracking, Live Oversight, Fraud Prevention, News Services).

Infrastructure (Datacenter Monitoring, Network Monitoring, Telecommunications, Energy Grids, Traffic Management, Transportation and Distribution).

Healthcare (Patient Data, Pharmaceuticals, Patient Monitoring).

Machine-to-Machine Computing (Sensors, Smart Buildings, Remote Monitoring, Predictive Maintenance, Intrusion Prevention, Location Tracking, RFID, Process Control and Optimization, System and Network Monitoring, Environmental Monitoring).

High Performance Computing (Research, Supercomputing, Experimental Scientific Data, Bioinformatics, Modeling, Simulation).

Spreadsheets such as Microsoft Office Excel offer a powerful and widely used tool that helps individuals and organizations analyze information to make more informed decisions. Using tools such as Excel, users can share and manage analysis tasks and insights gleaned from analysis with coworkers, customers, and partners worldwide. This makes spreadsheets an important productivity tool that offer a highly complementary capability to that provided by stream processing systems. Existing spreadsheet applications, however, are not integrated with stream processing systems.

IBM's System S Research Project is developing a prototype aimed at providing the "middleware" required to coordinate a wide range of distributed stream processing applications. The System S research project aims to produce a stream processing framework that is general-purpose. System S assumes that there are many user-developed stream processing components in use across the Internet, and the main goal of the System S Stream Processing Core is to provide middleware coordination software that can tie these numerous components together in useful ways. However, System S does not provide a solution that can be used to build a scalable stream processing architecture. In a recent paper (IBM InfoSphere Streams: Based on the IBM Research System S Stream Computing System, IBM Corporation, Mar. 2009), IBM outlines how the SPADE toolkit of System S can be used to build workflow assemblies without needing to understand the lower-level stream-specific operations. This middleware toolkit can be used through an Eclipse-based Workflow Development Tool Environment that includes an Integrated Development Environment (IDE) of the kind familiar to professional software developers, but which would be quite unfamiliar to spreadsheet developers. System S does not provide any kind of system or methodology for data processing that combines stream processing and spreadsheet computation, nor does it provide any means of developing stream processing systems, or controlling stream processing systems, from within a spreadsheet. System S also does not provide a system or methodology for data processing wherein the stream processing systems are cloud computing services, and where the stream processing can be carried out across one or more distinct cloud computing architectures, with all design, control and coordination of the multiple stream processing computations from within a spreadsheet.

What is needed is a solution that combines the functionality of a spreadsheet with stream processing systems in a seamless fashion. Such a solution is desirable in that it would provide users with an easy to use, yet powerful tool for processing data streams. Ideally, such a solution would provide connectivity to one or more stream processing systems spread across local and/or cloud-based architectures so as to allow for processing large volumes of data in parallel. The present invention provides a solution for these and other needs.

SUMMARY OF INVENTION

A system and methodology for data processing combining stream processing and spreadsheet computation is described. In one embodiment, a system for data processing combining stream processing and spreadsheet computation comprises: one or more Cloudscale Stream Processors (CSPs), at least one Cloudscale-enabled spreadsheet, a web services architecture, and one or more data sources. The stream processing systems can be on the same computer architecture as the spreadsheet, or they can be provided as cloud computing services, and can even be running on a number of physically distinct cloud computing architectures. Each CSP takes a set of streams of input data and outputs a set of streams of data. Each stream is a time-ordered stream of files which when concatenated together comprise the stream. The Cloudsale-enabled spreadsheet is used to provide a wide range of complementary capabilities that together with the CSPs provides a comprehensive and powerful data processing architecture. The Cloudscale-enabled spreadsheet provides the tools and technologies required for user authentication, stream discovery, data source extraction and new stream design. It also includes features for CSP discovery, new CSP design, CSP output stream storage, CSP checking and validation, cycle and synchronization controls for CSPs and spreadsheets, offline stream processing, specifying lease lengths for CSPs, dashboards and visualization, and for collaborative data processing. Although in the currently preferred embodiment each CSP processes only a single (possibly merged) stream of data, the present invention enables users to harness the powerful built-in capabilities of existing spreadsheet programs (e.g., Microsoft Excel or another spreadsheet) in order to coordinate, synchronize and correlate the processing of any number of stream processors in order to carry out powerful real-time, highly parallel data processing all from within a single spreadsheet. Moreover that data processing can be seamlessly spread across any number of local computing architectures and any number of cloud computing services.

In another embodiment, for example, a system of the present invention for processing of data streams is described that comprises: at least one computer system including at least a processor and memory; at least one stream processing module that processes one or more input streams of data and produces output data; a spreadsheet plug-in module that receives output data from the at least one stream processing module and inputs the output data into spreadsheet cells in a spreadsheet module; and a spreadsheet module that calculates values in the spreadsheet cells based on the data input by the spreadsheet plug-in module and displays calculated values in spreadsheet cells of a user interface of the system.

The present invention provides for seamlessly combining stream processing and spreadsheet computation. The solution provides users with an easy to use, yet powerful tool for processing data streams. The present invention, in its currently preferred embodiment, operates in conjunction with existing commercial spreadsheet applications so as to provide users with a well-known and easy to use interface for stream processing. The solution enables users to perform various tasks on data streams using a convenient spreadsheet interface, thereby providing a powerful new data processing architecture for data analysis and a wide variety of other uses. The Cloudscale-enabled spreadsheet of the present invention operates seamlessly in conjunction with stream processing systems (e.g., with one or more Cloudscale Stream Processors). Moreover, the present invention allows connectivity to one or more stream processing systems spread across local and/or cloud-based architectures, enabling large volumes of data to be processed in parallel.

DETAILED DESCRIPTION

Glossary

Figure 1:
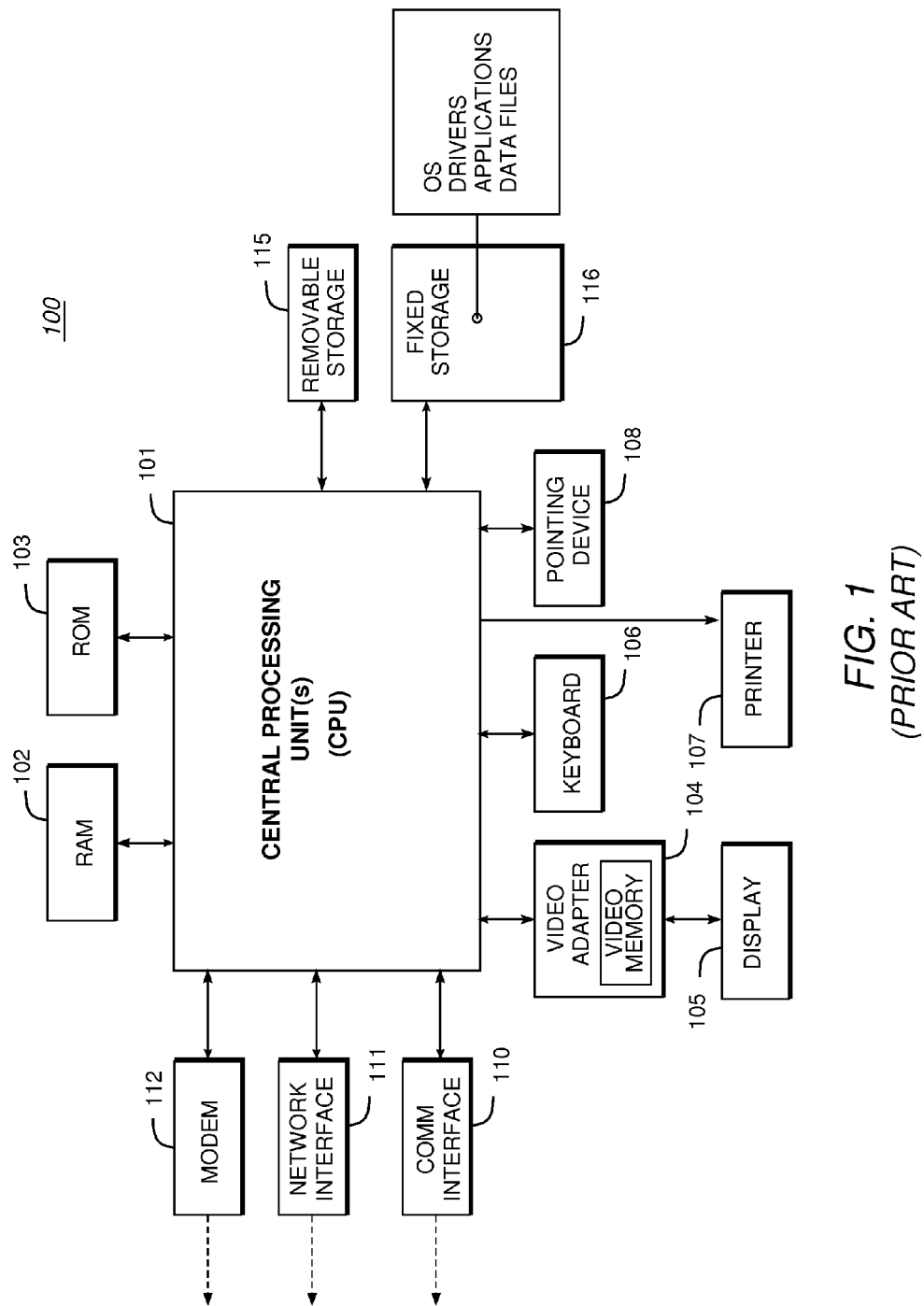
FIG. 1 is a general block diagram of a computer system (e.g., an IBM-compatible system) in which software-implemented processes of the present invention may be embodied.

The following definitions are offered for purposes of illustration, not limitation, in order to assist with understanding the discussion that follows.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium (W3C) recommendation dated Dec. 24, 1999, the disclosure of which is hereby incorporated by reference. A copy of this specification is currently available from the W3C (w3.org) via the Internet.

SCF: SCF stands for the Simple Column Format of the Cloudscale Stream Processor which provides a unified data format for heterogeneous data streams as described in further detail in this document. The Simple Column Format comprises a two-dimensional cell-based data format for heterogeneous streams, with each SCF stream comprising rows and columns. The values in a given SCF column are of a homogeneous type (e.g., all strings or all integers). Additionally, each SCF row has a time stamp in the currently preferred embodiment and such time stamps are non-decreasing through the rows of a stream.

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (5th Edition, Nov. 26, 2008) a recommended specification from the W3C, the disclosure of which is hereby incorporated by reference. A copy of this specification is currently available from the W3C (w3.org) via the Internet.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Linux operating system. The present invention, however, is not limited to any one particular application or any particular environment. Instead, those skilled in the art will find that the system and methods of the present invention may be advantageously embodied on a variety of different platforms, including Macintosh, Microsoft Windows, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Red Hat Linux (Red Hat, Inc. of Raleigh, N.C.), Suse Linux (Novell of Waltham, Mass.), Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying computer components that may be employed for implementing the present invention. For purposes of discussion, the following description will present examples in which it will be assumed that there exists a conventional, general-purpose computer system or server such as the system illustrated in FIG. 1 or a group of such systems that communicate with one via a network. Typically, each computer system will have some number of microprocessors, and each of those microprocessors will have some number of processor cores. For example, a system might have eight microprocessors, each with four processor cores, giving a total of thirty-two cores for the system. The present invention places no restrictions on the number and configuration of processors that may be utilized. Additionally, there is no requirement that the number of cores in each microprocessor be the same, there is no limit on the number of microprocessors within a system, and there is no limit on the number of cores in any one processor. In the simplest case, the system will have one microprocessor with one core. Examples of conventional multi-core microprocessors that may be used are those available from Intel Corporation of Santa Clara, Calif., Advanced Micro Devices Corporation of Sunnyvale, Calif. or Sun Microsystems of Mountain View, Calif. However, any other suitable processor may be utilized for implementing the present invention. Random-access memory serves as the working memory for the processor cores. Mass storage devices provide persistent storage on fixed and removable media, such as magnetic, optical or magnetic-optical storage systems, flash memory, or any other available mass storage technology. The mass storage may be shared on a network, or it may be a dedicated mass storage. The system itself communicates with other devices (e.g., other computers) via a conventional network interface card connected to a network. The present invention places no restrictions on the amount of memory or mass storage required in the hardware system, or on the forms of networking to be used.

General-purpose computer systems of the kind described are available from many vendors. Representative vendors include Dell Computers of Round Rock, Tex., Hewlett-Packard of Palo Alto, Calif., IBM of Armonk, N.Y., Sun Microsystems of Mountain View, Calif., and Apple of Cupertino, Calif. One specific example of such a general-purpose system available in 2009 is the Dell PowerEdge 2950 which can be configured with two quad-core Intel Xeon microprocessors (total 8 cores), 32 gigabytes of memory, and six terabytes of mass storage. The present invention, however, is not limited to any particular environment or device configuration. In particular, a server-based distinction is not necessary to the invention, but is used to provide a framework for discussion. Instead, the present invention may be implemented in any type of system architecture or processing environment capable of supporting the methodologies of the present invention presented in detail below.

Overview of System and Methodology for Data Processing Combining Stream Processing and Spreadsheet Computation At a high level, the system and methodology of the present invention combines stream processing systems with spreadsheet applications in a seamless fashion so as to provide users with a powerful and flexible data processing solution. In one embodiment of the present invention, for instance, a system for data processing combining stream processing and spreadsheet computation comprises: one or more stream processing systems (e.g., Cloudscale Stream Processors), a Cloudscale-enabled spreadsheet of the present invention (e.g., implemented by extending the functionality of Microsoft Excel or another spreadsheet application), a web services architecture, and one or more data sources. In its presently preferred embodiment, the present invention is implemented using one or more Cloudscale Stream Processors such as those described in commonly-owned, co-pending U.S. patent application Ser. No. 12/343,215 filed Dec. 23, 2008, the description of which is hereby incorporated by reference. However, the present invention may be implemented using one or more alternative stream processing systems, if desired. The stream processing systems (e.g., Cloudscale Stream Processors) can be implemented to run on the same computer architecture as the spreadsheet application, or they can be provided as cloud computing services, and can even be running on a number of physically distinct cloud computing architectures. In describing the currently preferred embodiment of the present invention the Cloudscale Stream Processors will be sometimes be referred to as "CSPs".

Integration with Spreadsheet Applications

The present invention, in its currently preferred embodiment, operates in conjunction with existing commercial spreadsheet applications so as to provide users with a well-known and easy to use interface for stream processing. The system and methodology of the present invention provides for extending the functionality of such existing spreadsheet applications to operate seamlessly in conjunction with stream processing systems (e.g., with one or more Cloudscale Stream Processors). Before describing the present invention in more detail, some background discussion of spreadsheets and the features they include to enable extension of their functionality and/or integration with other technologies is appropriate.

Current commercial spreadsheet products typically provide open interfaces enabling their functionality to be extended. For example, Microsoft Excel has evolved from a closed proprietary system to one that provides open standard interfaces and a well-defined extensibility framework. Excel 2007, in particular, enables third parties to develop extensions to the new Ribbon user interface. The Ribbon is the strip of buttons and icons located above the work area in the Excel 2007 user interface. The Ribbon replaces certain menus and toolbars found in earlier versions of Excel and enables third parties to seamlessly integrate their extensions into the Excel 2007 user interface. Such extensions can be implemented through the use of the Excel extensibility framework and the Excel Object Model. Microsoft has also opened the Office and Excel file formats by standardizing them with international standards organization as the Office Open XML (OOXML) specifications. This enables data that is stored in Excel to be ported to other applications which may run on any number of different operating systems. In addition, the Excel Extensibility framework provided by the Microsoft IDTExtensibility2 interface (available from Microsoft Corporation) enables seamless integration of third party extensions to Excel as plug-ins. The availability of open interfaces and extensibility frameworks for spreadsheets such as Excel opens up the possibility of seamlessly integrating spreadsheets with other complementary tools and technologies for data analysis such as supercomputing systems, database systems and stream processing systems.

Since 2002, Microsoft Excel has provided a worksheet function called RealTimeData (RTD) that lets one call a server to get real-time data into Excel. This RTD server can run locally (e.g., on the same local machine running Excel) or on a remote server. EditGrid of Hong Kong also provide mechanisms as part of their EditGrid Excel Plus product for getting real-time data into their spreadsheet. Several companies, including Streambase of Lexington, Mass., have used Microsoft's RTD server mechanism in order to output data from a stream processing system into Excel and to output data from Excel into stream processing systems. For example, Streambase provide that functionality in the Streambase External Adapter for Microsoft Excel. However, in contrast to the present invention, these mechanisms do not enable spreadsheet users to develop stream processing systems within the spreadsheet, nor do they enable users to connect a spreadsheet to multiple stream processing systems spread across a number of local and cloud-based architectures. Instead, with these existing solutions the spreadsheet is simply being used as a dashboard for a stream processing system or as an input source.

Although spreadsheet applications such as Microsoft Excel are typically run on a single local personal computer, it is possible to run a spreadsheet on a parallel processing system to improve performance, or to run it on a cloud-based architecture in order to deliver the spreadsheet functionality as an online service rather than as a packaged software product to be installed on a local machine. It should be understood, however, that these parallel and cloud versions of spreadsheets are simply adjusting the performance of the spreadsheet or adjusting the means of delivery and do not provide a means of seamlessly integrating the functionality of a spreadsheet with that of stream processing systems.

Role of Stream Processing Systems

The Cloudscale Stream Processor provides a scalable, general-purpose system and method for continuous processing of data streams by multiple programs. It can be used to solve a wide range of challenging stream processing problems on heterogeneous data streams containing a mixture of structured, semi-structured, and unstructured data. The Cloudscale Stream Processor can be used to process live time-ordered data streams, stored time-ordered data streams, and unordered tables of data. Stream processing applications in business, government and on the web may require complex combinations of analysis, statistical monitoring, filtering, tracking and tracing, inference, deduction and pattern matching. The Cloudscale Stream Processor allows such applications to process more data, more forms of data, and to provide more complex forms of processing. Additionally, it permits parallel processing to be used at multiple levels in an application to achieve the highest levels of performance and scalability. Each Cloudscale Stream Processor (CSP) takes a set of streams of input data and outputs a set of streams of data. Each stream is a time-ordered stream of files which when concatenated together comprise the stream.

Where there are multiple input streams, the streams are merged in time order before processing. A computed stream can also be partitioned to produce a set of output streams. In describing the present invention, the following discussion will, without loss of generality, focus on the core case in which each CSP takes a single input stream and outputs a single stream. By simply adding standard merging and partitioning, this can be easily extended to multiple input streams and output streams. Thus, the discussion of the core case of a single input stream and a single output stream should be viewed as an illustrative example and not as a limitation.

Role of Spreadsheet

The Cloudscale-enabled spreadsheet of the present invention is used to provide a wide range of complementary capabilities that together with the CSPs (and/or other stream processors) provides a comprehensive and powerful data processing architecture. The Cloudscale-enabled spreadsheet provides the tools and technologies required for user authentication, stream discovery, data source extraction and new stream design, CSP discovery, new CSP design, CSP output stream storage, CSP checking and validation, cycle and synchronization controls for CSPs and spreadsheet, offline stream processing, specifying lease lengths for CSPs, dashboards and visualization, and for collaborative data processing. Although each CSP processes only a single (possibly merged) stream of data, the present invention enables users to harness the powerful built-in capabilities of Excel (or another spreadsheet application) in order to coordinate, synchronize and correlate the processing of any number of stream processors (e.g., CSPs). This enables users to carry out powerful real-time, highly parallel data processing all from within a single spreadsheet. Moreover, the actual processing of streaming data can be seamlessly spread across any number of local computing architectures and/or any number of cloud computing services.

Role of Web Services

The web services component of the present invention provides software support for communications between the spreadsheet clients and the CSP services. As described previously, the CSPs can be implemented as cloud computing services and/or on local computing devices made available to Cloudscale-enabled spreadsheet clients.

Example

Market and News Data

A simple example of the capabilities of the present invention is provided by the following data processing challenge from the area of financial services. The problem is to automatically alert a financial trader as quickly as possible when the following conditions occur: (i) a particular unusual pattern is detected in the latest market data for a particular company's stock on the NASDAQ Stock Exchange; and (ii) there have been two or more news or blog articles on that company within the ten minute period leading up to the point at which the unusual market data pattern was detected.

NASDAQ provides live market data streams and it is straightforward to develop a CSP that will continuously process such a NASDAQ stream, outputting a stream of alerts in real-time whenever the pattern of interest is detected for a particular company's stock. Similarly, web services such as Spinn3r provide users with a continuous real-time stream of semi-structured data containing the latest news and blog posts from millions of blogs and hundreds of major news sources. As with the NASDAQ data, one can easily develop a CSP or other stream processor that will continuously process the Spinn3r stream, outputting a stream of alerts in real-time whenever two or more news or blog articles on the company of interest have appeared in the past ten minutes.

As will be shown, the present invention enables the output streams from these two CSPs to be coordinated, synchronized and correlated within a single spreadsheet in real-time in order to solve the data processing challenge. Moreover, the various elements of the overall solution might be running on several physically distinct computer architectures around the world. For example, the spreadsheet might be Excel running on a local PC, the NASDAQ CSP might be running on a Linux-based Amazon Machine Image somewhere within Amazon Web Services cloud computing service, and the Spinn3r CSP might be running on a Windows-based service within Microsoft's Azure cloud computing infrastructure.

Example

Clickstream and Network Data

A second example of the capabilities of the present invention is provided by the following data processing challenge from the area of web analytics. The problem is to automatically correlate a change in customer behavior on a web site with a problem within the network infrastructure powering the customer service.

Modern web services are highly instrumented to capture log data on all user interactions with the site. For example, many web services use Apache web server software, and this software can be set up to capture and report a stream of all user interactions with the service. This stream of live log data can be processed by a CSP in order to generate alerts in real-time whenever certain types of patterns are detected in customer behavior. One common example for electronic commerce sites is where an alert is generated whenever there is a sudden unexpected increase in the percentage of shopping carts abandoned before reaching the checkout stage. This may indicate that the latency that users are experiencing on the site has increased significantly, causing users to leave in frustration.

Similarly, modern web infrastructure components (servers, storage, networks, databases) are also highly instrumented to continuously report on the health and performance of the infrastructure. Monitoring tools are deployed to deliver a continuous stream of information to systems administration staff responsible for infrastructure support and maintenance. These streams of information can also be processed by CSPs to automatically produce a stream of intelligent real-time alerts.

As in the previous example, the present invention enables the output streams from these various customer and infrastructure CSPs to be coordinated, synchronized and correlated within a single spreadsheet in real-time in order to intelligently detect and rapidly correct problems in the web infrastructure that may be resulting in significant loss of sales.

Cloud Computing

As previously mentioned, a system for data processing combining stream processing and spreadsheet computation comprising one or more CSPs, a Cloudscale-enabled spreadsheet, and one or more data sources may be implemented (in whole or in part) using cloud computing architectures. Although the stream processing systems can be on the same computer architecture as the spreadsheet, they can alternatively be made available as cloud computing services, and can even be running on a number of physically distinct cloud computing architectures.

Cloud computing architectures are rapidly becoming a standard way of carrying out large-scale computation and data processing. Companies such as Amazon offer Amazon Web Services, a public cloud infrastructure that is used by hundreds of thousands of software developers. Other public clouds include Microsoft's Windows Azure and Google's App Engine. In addition to these vendor-specific cloud computing infrastructures, a new array of sector-specific cloud infrastructures are also beginning to be made available. For example, the US Government is keen to develop several clouds devoted to coordinating data and computation across various areas of government. For instance, there might be an Intelligence Cloud, a Defense Cloud, and a Tax Cloud. Similarly there are plans to create new sector-specific clouds in areas such as healthcare, environment, research and finance. Finally, there are plans by many large corporations and other large organizations to create private cloud infrastructures for their own internal use. This proliferation of cloud computing architectures is creating a new challenge of being able to carry out complex data processing across multiple clouds—some vendor-specific, some sector-specific, some public, some private. The present invention provides a solution to this challenge, a solution that can be used by anyone with access to a spreadsheet. With the present invention, users can carry out complex data processing on live or historical data, in real-time, and with large-scale parallelism, all from within a standard desktop spreadsheet environment, or from within a spreadsheet that is itself running in a cloud and is accessed by an Internet browser.

System Components

Component Overview

Figure 2:
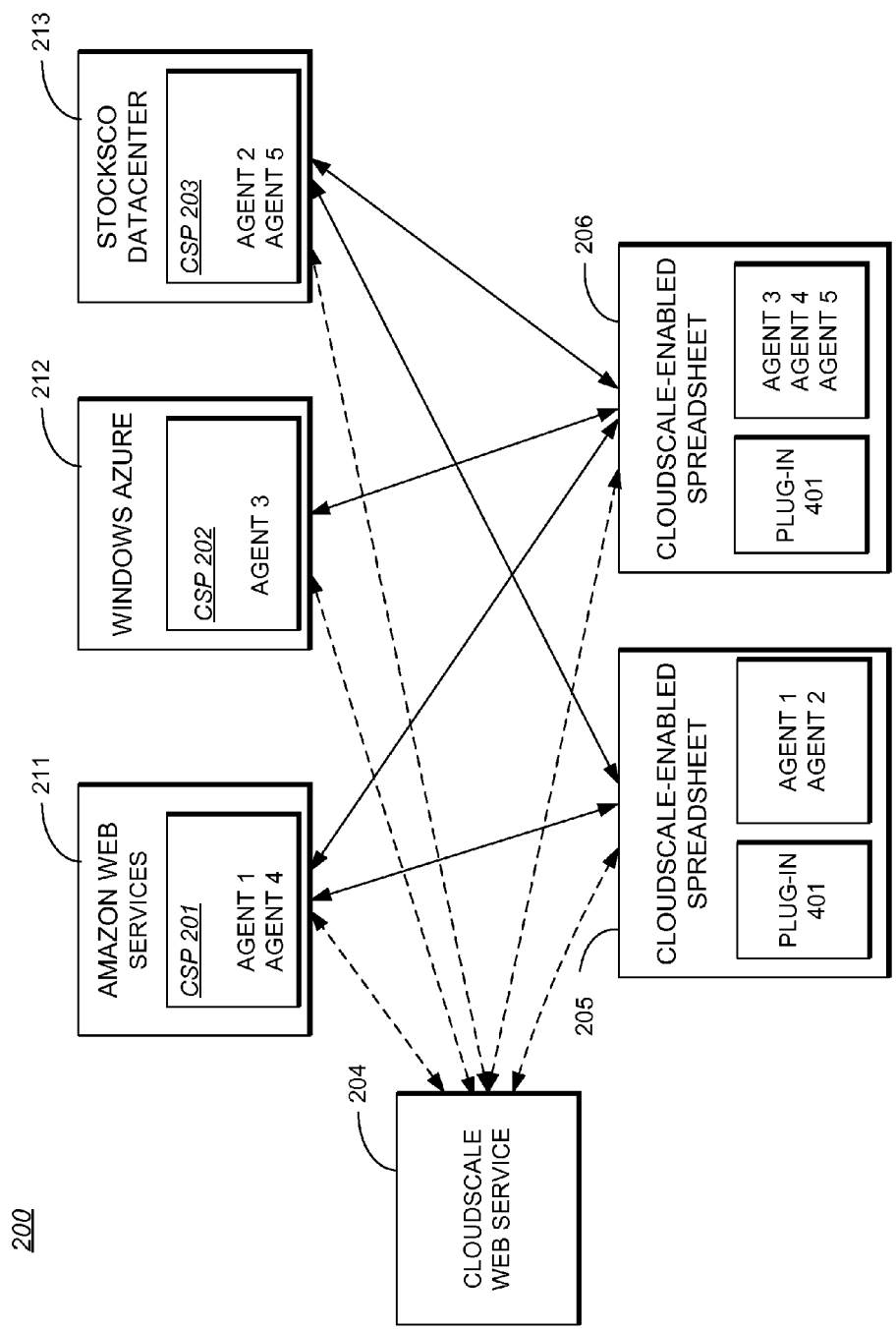
FIG. 2 is a block diagram of the main components of the present invention, showing the data flow between the various components.

Next, the various high-level components that, in the currently preferred embodiment of the present invention, together comprise a system for data processing combining stream processing and spreadsheet computation will be described. The components of a system constructed in accordance with the teachings of the present invention and their interactions may be illustrated by example. For instance, FIG. 2 shows a simplified block diagram 200 depicting the components that may be utilized in an example instance of the system of the present invention. In the example shown, there are three Cloudscale Stream Processors (CSPs) as shown at 201, 202, 203 and two Cloudscale-enabled spreadsheet clients as illustrated at 205, 206 at FIG. 2. However, those skilled in the art will appreciate that many other possible arrangements of components are possible.

In the example illustrated at FIG. 2, CSP 201 is running on the Amazon Web Services public cloud 211, CSP 202 is running on the Windows Azure public cloud 212, and CSP 203 is running on the Stocksco Datacenter private cloud 213. Both Excel spreadsheet clients 205, 206 are Cloudscale-enabled and have the Cloudscale plug-in installed. Spreadsheet client 205 is running two agents, Agent 1 on Amazon CSP 201 and Agent 2 locally on Stocksco CSP 203. Spreadsheet client 206 is running three agents as follows: Agent 4 on Amazon CSP 201, Agent 3 on Azure CSP 202, and Agent 5 locally on Stocksco CSP 203. The Cloudscale Web Services component 204 provides software support for the communications between spreadsheet clients 205, 206 and CSP services 201, 202, 203. Note that although the Web Services architecture is coordinating the communications, it is also possible and desirable for a client to communicate directly with a CSP. This ensures that the system of the present invention does not have the Web Services component as a bottleneck for communications, and as a single point of failure. With the ability to send huge amounts of streaming data directly from any CSP to any client, the system is massively scalable. The Web Services component need only handle low volumes of data related, for example, to authentication, billing, and other administrative functions. The Web Services architecture can therefore be easily and cheaply made reliable using standard file system and database techniques. The CSPs themselves handle all aspects of recovery and fault tolerance for agents. Each of the components is described below in more detail.

Stream Processing Systems

A system construed in accordance with the present invention may include one or more stream processors. In the currently preferred embodiment of the present invention, one or more Cloudscale Stream Processors (CSPs) are utilized as the stream processing component of the solution. Each CSP takes a single stream of input data and outputs a single time-ordered stream of files which when concatenated together contain the stream of rows output by the CSP. For example, the stream of rows output by a CSP computing the Volume-Weighted Average Price (VWAP) of NASDAQ stocks might begin with the following sequence of files where each file contains a section of the SCF stream output by the CSP:

VWAP20090518094005.scf
VWAP20090518094223.scf
VWAP20090518094412.scf
VWAP20090518094609.scf
VWAP20090518094759.scf
VWAP20090518094901.scf
VWAP20090518095103.scf The stream of files can be written to whichever type of file system is most appropriate. For example, it can be written to a local file system, to a network file system, or to a cloud-based storage system such as the Amazon Simple Storage Service (Amazon S3) or Microsoft's Azure storage services.

In addition to outputting a stream of output data files for each CSP, the CSP can also be set to regularly output a checkpoint of the live state of the CSP computation. As in the case of the output data files, the checkpoint file can be written to a local file system, to a network file system, or to a cloud-based storage system. Thus, the output from the VWAP CSP above might, for example, begin with the following sequence of files in which each cpt file contains a checkpoint output by the CSP:

VWAP20090518094005.scf
VWAP20090518094223.scf
VWAP20090518094412.scf VWAP20090518094412.cpt
VWAP20090518094609.scf
VWAP20090518094759.scf
VWAP20090518094901.scf VWAP20090518094901.cpt
VWAP20090518095103.scf In many applications, there may be no requirement to maintain multiple checkpoint files for a single running CSP, in which case each new checkpoint file may simply replace the previous one so as to reduce space requirements.

With checkpointing turned on for a CSP, it becomes straightforward to quickly recover from hardware or software failures, without having gaps in the stream of outputs. For example, consider the case where the VWAP CSP has the following output:

VWAP20090518094005.scf
VWAP20090518094223.scf
VWAP20090518094412.scf VWAP20090518094412.cpt
VWAP20090518094609.scf
VWAP20090518094759.scf but has not yet output the below:
VWAP20090518094901.scf VWAP20090518094901.cpt.

Also assume that in this case the hardware or software running the VWAP CSP experiences some kind of failure. The system will fail to receive a heartbeat signal from the failed CSP and after a short time-out period will roll back the continuous stream computation to the point at which the following two files were output:

VWAP20090518094412.scf VWAP20090518094412.cpt.
The system will restart the computation from that point to ensure no loss of output; i.e., no gaps in the output stream of data from the CSP.

Cloudscale-Enabled Spreadsheet

As previously noted, a Cloudscale-enabled spreadsheet is used to provide a wide range of complementary capabilities that together with the CSPs provides a comprehensive and powerful data processing architecture. The Cloudscale-enabled spreadsheet provides the tools and technologies required for user authentication, stream discovery, data source extraction and new stream design, CSP discovery, new CSP design, CSP output stream storage, CSP checking and validation, cycle and synchronization controls for CSPs and spreadsheet, offline stream processing, specifying lease lengths for CSPs, dashboards and visualization, and for collaborative data processing. Components of the Cloudscale-enable spreadsheet are described in more detail below and illustrated at FIG. 4.

Spreadsheets are amongst the most widely used software products in the world. It is estimated that several hundred million people use Microsoft Excel alone. A spreadsheet is a software system that simulates a paper worksheet. It consists of a two-dimensional array of cells, each of which can contain alphanumeric text, or a numeric value, or a formula that defines how the value of that cell should be calculated from the value of any other cell (or values of any other set of cells) each time any cell is updated. Spreadsheets are widely used in business and finance because of their powerful ability to recalculate the entire sheet of values automatically after a change is made to one or more cells.

In many simple business and financial applications, automatic recalculation of a whole spreadsheet after even a single change to one cell is an attractive feature of a spreadsheet. In cases where the number of cell values is very large, it is common to switch off this automatic recalculation capability in order to improve performance and responsiveness. The spreadsheet is then in manual mode and recalculation can be explicitly requested by the user when required, for example, after a large block of thousands of cell values has been updated to new values.

Originally spreadsheets had only a single two-dimensional grid of cells. Today it is common for a spreadsheet to have a number of sheets, each one of which is a two-dimensional grid of cells.

A cell reference is the name of a spreadsheet cell. A typical cell reference is "B5" which refers to the cell in column B, row 5. It is customary to refer to the columns using a sequence of case-insensitive letters, e.g., "B" or "DA", and to refer to the rows using a positive integer value, e.g., 5 or 1782. In situations where there is more than one sheet in use, a cell can be unambiguously referenced by also giving the sheet name, e.g. "SHEET3!B5"

Today there are a large range of free and commercial spreadsheet products available, including Microsoft Excel from Microsoft Corporation, OpenOffice.org Calc from Sun Microsystems, open source Gnumeric, and Numbers from Apple Computer, Inc. Of these, Microsoft Excel is by far the most widely used. In the currently preferred embodiment of the present invention described herein the spreadsheet that is utilized is Microsoft Excel, but the present invention may also be implemented using a wide range of other spreadsheet products, as desired.

Excel Object Model

To develop solutions that use Microsoft Office Excel, it is possible to interact with the objects provided by the Excel Object Model. Currently, access to the object model is provided through a set of four classes:

Microsoft.Office.Interop.Excel.Application
Microsoft.Office.Interop.Excel.Workbook
Microsoft.Office.Interop.Excel.Worksheet
Microsoft.Office.Interop.Excel.Range The model directly emulates the Excel user interface. For example, the Application object represents the entire application, and each Workbook object contains a collection of Worksheet objects. From there, the major abstraction representing cells is the Range object, which allows one to work with individual cells or groups of cells.

In the currently preferred embodiment of the present invention, the Excel Ribbon Extensibility framework is used to define an Excel plug-in that enables the addition of a Cloudscale tab to the standard Excel Ribbon. When this plug-in is installed it enables the Excel user to see the Cloudscale tab in the Ribbon and use it to seamlessly integrate the CSPs. From the Ribbon, users can connect to the Cloudscale service, explore data sources, define streams and computations that will execute on a local server or in a public or private cloud, and control the interaction between the various CSPs, perhaps operating on different servers or even in different clouds, and the Excel computation engine itself.

To enable these features, the Cloudscale plug-in uses the Excel Object Model to read and write to cells in the Excel spreadsheet. Internally the plug-in maintains the state of the Cloudscale computation and manages the interactions with the various CSPs using standard networking protocols. The user interacts with the CSPs by making changes to the worksheets known by the plug-in to contain the various CSP specifications. The Ribbon is used to control the nature of the interaction between the Cloudscale service and the Excel computation engine.

Web Services

The web services component of the present invention provides software support for the communications between the spreadsheet clients and the CSP services. In cases where the servers are non-local (e.g., provided in the cloud), the design of the web services architecture follows the standard REST (Representational State Transfer) design approach. All service calls are authenticated with a client identifier and a secret key. The following services are provided in the currently preferred embodiment:

| Service | Create (PUT) | Read (GET) | Update (PUT) | Delete (DEL) |
| --- | --- | --- | --- | --- |
| Authentication | | getStatus | | |
| Resource | saveToCloud | getFromCloud | updateInCloud | delFromCloud |
| Validation | saveExpr | getStatus | updateExpr | delExpr |
| Agent | Start | getStatus | extend | stop |
| Result | | getData | | delData |

The Authentication Service checks for service availability and authenticates spreadsheet client. The Resource Service enables client to save XML documents to the CSP and to retrieve XML documents from the CSP. The CSP agent program file, stream configuration, and task description are all saved in the CSP prior to execution. The Validation Service enables clients to request validation of a CSP agent or agent fragment against the XML schema that defines the correct form of agents. The Agent Service enables clients to start the execution of an agent (Create), get status information about a running agent, including duration of execution (Read), allow client to alter the lease length of a running agent (Update), and stop a running agent (Delete). Stopping an agent may take some time, but its progress can be checked using the Read operation of the Agent Service. The Result Service enables the client to retrieve stream output files from the CSP (Read), and to remove stream output files from the CSP (Delete).

System Operation

Login Service

From within a running Excel spreadsheet, a user can "connect to Cloudscale" by providing a username and password which, once authenticated, will enable the user to use a whole range of stream processing and other data processing services directly from the spreadsheet. In this following discussion, this will be referred as the spreadsheet being in Cloudscale-mode. Once in Cloudscale-mode, the modified spreadsheet provides the user with all of the tools and technologies required for user authentication, stream discovery, data source extraction and new stream design, CSP discovery, new CSP design, CSP output stream storage, CSP checking and validation, cycle and synchronization controls for CSPs and spreadsheet, offline stream processing, specifying lease lengths for CSPs, dashboards and visualization, and for collaborative data processing. In the following sections each of these capabilities will be described.

Stream Discovery

The present invention enables users to analyze and transform information in data processing environments and includes features for analyzing, filtering, enhancing and processing streams of data, including live time-ordered data streams, stored time-ordered data streams, and unordered tables of data. A first step in carrying out data processing is to discover what data (live streams, stored streams, unordered tables) is available As soon as a user's spreadsheet is in Cloudscale-mode, the user can simply click on an icon to "Discover Data". The system will respond by detecting the set of data sources that are currently available to that user on local filesystems, on network filesystems, and on the various cloud-based storage systems that the user has access to. For example, the system might respond with the following list:

| Name | Format | Location |
|---|---|---|
| NASDAQ_VWAP | SCF | amazon.cloudscale.com |
| NASDAQ_Last_Sale | CSV | amazon.cloudscale.com |
| BATS_Last_Sale | TSV | azure.cloudscale.com |
| BATS_Last_Sale | TSV | local (stocksco.com) |
| Spinn3r_Blog_News_Feed | RSS | azure.cloudscale.com |
| Stocksco_Team_Feed | Atom | local (stocksco.com) |
| Wikipedia_Pages | HTML | amazon.cloudscale.com |
| Wikipedia_Pages_Stream | SCF | amazon.cloudscale.com |
| US_Fund_Holdings | CSV | local (stocksco.com) |
| Money_Markets | CSV | local (stocksco.com) |
| Stocksco_Market_Last_Trade | CSV | local (stocksco.com) |
| Stocksco_Customer_Account | CSV | local (stocksco.com) |
| Stocksco_Brokerage_TradeReq | CSV | local (stocksco.com) |
| Stocksco_Brokerage_Trade | CSV | local (stocksco.com) |
| Stocksco_Brokerage_Settlement | CSV | local (stocksco.com) |

In the case of the two SCF sources in the list, each of these can be used directly as input to a CSP. For the others a new SCF stream design needs to be created before the data can be processed with a CSP. As the currently preferred embodiment of the present invention utilizes one or more CSPs for stream processing, conversion of the data into SCF form is performed to facilitate processing by such CSPs.

New Stream Design

Given any source of structured, semi-structured or unstructured data, one can create a new SCF stream design by selecting, extracting and naming the required columns. A related patent application (U.S. patent application Ser. No. 12/343,215, Dec. 23, 2008) describes in detail the steps involved in converting from tables, text, feeds and graphs into the unified SCF form. The present invention provides a simple spreadsheet interface for this selection and conversion process. Consider, for instance, the above list of data sources presented to an Excel user in Cloudscale mode. The user can select one of these sources as containing the data of interest such as, for example, Stocksco_Brokerage_Trade as shown below:

| Name | Format | Location |
|---|---|---|
| Stocksco_Brokerage_Trade | CSV | local (stocksco.com) |

Following this selection, the system presents the user with a list of the available columns in that data source:

| Column | Type | Description |
|---|---|---|
| ID | string | Trade identifier |
| DATETIME | time | Date and time of trade |
| STATUS | string | Status of trade |
| TRADETYPE | string | Type of trade |
| CASHMARGIN | boolean | Cash or margin trade |
| SYMBOL | string | Security symbol |
| QUANTITY | integer | Quantity traded |
| BIDPRICE | double | Requested unit price |
| CAID | string | Customer account identifier |
| EXECNAME | string | Name of person executing the trade |
| TRADEPRICE | double | Unit price at which security was traded |
| CHARGE | double | Fee charged for placing trade request |
| COMMISSION | double | Commission earned on trade |
| TAX | double | Tax due on trade |

The user may now select the columns of interest, for example, DATETIME, SYMBOL, QUANTITY, BIDPRICE and TRADEPRICE as illustrated below:

| Column | Type | Description |
|---|---|---|
| DATETIME | time | Date and time of trade |
| SYMBOL | string | Security symbol |
| QUANTITY | integer | Quantity traded |
| BIDPRICE | double | Requested unit price |
| TRADEPRICE | double | Unit price at which security was traded |

The system then has the information required to enable it to create a new SCF stream derived from the original CSV data source. The user can provide a name for the new stream, for example, Stocksco_Brokerage_Trade_DSQBT and add it to the list of available data sources:

| Name | Format | Location |
|---|---|---|
| NASDAQ_VWAP | SCF | amazon.cloudscale.com |
| NASDAQ_Last_Sale | CSV | amazon.cloudscale.com |
| BATS_Last_Sale | TSV | azure.cloudscale.com |
| BATS_Last_Sale | TSV | local (stocksco.com) |
| Spinn3r_Blog_News_Feed | RSS | azure.cloudscale.com |
| Stocksco_Team_Feed | Atom | local (stocksco.com) |
| Wikipedia_Pages | HTML | amazon.cloudscale.com |
| Wikipedia_Pages_Stream | SCF | amazon.cloudscale.com |
| US_Fund_Holdings | CSV | local (stocksco.com) |
| Money_Markets | CSV | local (stocksco.com) |

-continued

| Name | Format | Location |
|---|---|---|
| Stocksco_Market_Last_Trade | CSV | local (stocksco.com) |
| Stocksco_Customer_Account | CSV | local (stocksco.com) |
| Stocksco_Brokerage_TradeReq | CSV | local (stocksco.com) |
| Stocksco_Brokerage_Trade | CSV | local (stocksco.com) |
| Stocksco_Brokerage_Settlement | CSV | local (stocksco.com) |
| Stocksco_Brokerage_Trade_DSQBT | SCF | local (stocksco.com) |

Being an SCF stream, Stocksco_Brokerage_Trade_DSQBT can be used directly as an input to a CSP.

CSP Discovery

The next step in carrying out stream data processing is to discover what CSPs are already available to the user. As soon as a user's spreadsheet is in Cloudscale-mode, the user can simply click on an icon to "Discover Agents". The system will respond by detecting the set of CSPs that are currently available to that user on local filesystems, on network filesystems, and on the various cloud-based storage systems that the user has access to. For example, the system might respond with the following list:

| Agent Name | Description |
|---|---|
| VWAP | Volume-Weighted Average Price |
| TWAP | Time-Weighted Average Price |
| FX | Foreign Exchange Tracker |
| DB | Double Bottom Stock Price Tracker |
| RDB | Relaxed Double Bottom Stock Price Tracker |
| NALERT | N Pattern In Stock Price |
| WINDOW | General Window Analyzer |
| THREEDAY | Three Day Moving Average |
| COMPLIANCE | Compliance Tracker |
| ALGO23 | Algorithmic Trader - Model 23 |
| BACK35 | Back Testing - Model 35 |
| ALGO35 | Algorithmic Trader - Model 35 |
| SENTIMENT | Blog Sentiment Analyzer |

The user can then simply choose one of the existing CSP agents and run it on some SCF stream. For example, the user can choose VWAP and run it on BATSLSCPV, an SCF stream derived from the BATS_Last_Sale data source by selecting the Company, Price and Volume columns.

New CSP Design

If none of the available pre-defined CSP agents is suitable for the kind of data processing required, then the user can create a new CSP design. As in all other aspects, the design of a new agent is carried out entirely within the spreadsheet. The present invention provides a simple spreadsheet interface for this design process. Consider the following example describing an XML representation of a CSP for calculating Volume-Weighted Average Price (VWAP):

```
1: <program>
2:     <inputoutputcolumn name="Company" type="string"/>
3:     <inputcolumn name="Price" type="real"/>
4:     <inputcolumn name="Volume" type="integer"/>
5:
6:     <internalcolumn name="A" type="real"/>
7:     <internalcolumn name="B" type="real"/>
8:     <internalcolumn name="C" type="integer"/>
9:     <internalcolumn name="D" type="boolean"/>
10:
11:    <outputcolumn name="E" type="real"/>
12:
13:    <windowdeclaration name="tenminutes">
14:        <align>
```

-continued

```
15:        <time>
16:            <string>2007-07-01T12:00:00Z</string>
17:        </time>
18:        </align>
19:        <duration>00:10:00</duration>
20:    </windowdeclaration>
21:
22:    <assign>
23:        <column name="A"/>
24:        <expr>
25:            <function name="convert_to_real"><column name="Volume"/></function>
26:            <op name="mul"/>
27:            <column name="Price"/>
28:        </expr>
29:    </assign>
30:    <parallel>
31:        <expr>
32:            <column name="Company"/>
33:        </expr>
34:        <window name="tenminutes">
35:            <assign>
36:                <column name="B"/>
37:                <expr><function name="window_fill_sum_of_values"><column name="A"/></function></expr>
38:            </assign>
39:            <assign>
40:                <column name="C"/>
41:                <expr><function name="window_fill_sum_of_values"><column name="Volume"/></function></expr>
42:            </assign>
43:            <assign>
44:                <column name="D"/>
45:                <expr><function name="window_mark_start"/></expr>
46:            </assign>
47:        </window>
48:    </parallel>
49:    <select>
50:        <expr>
51:            <column name="D"/>
52:        </expr>
53:        <assign>
54:            <column name="E"/>
55:            <expr>
56:                <column name="B"/>
57:                <op name="div"/>
58:                <function name="convert_to_real"><column name="C"/></function>
59:            </expr>
60:        </assign>
61:    </select>
62: </program>
```

In this example, the CSP comprises: three input columns Company, Price and Volume together with five computed columns A, B, C, D and E. The output stream of the CSP comprises the two output columns Company and E. The CSP contains a single select construct that filters the rows of the stream, based on the boolean value in column D. The above CSP is structured as a linear pipeline of building blocks in the manner described in commonly-owned, co-pending U.S. patent application Ser. No. 12/343,215 entitled "System and Methodology for Parallel Stream Processing", the disclosure of which is hereby incorporated by reference. The present invention is based on an alternative structuring of a CSP as simply an unordered collection of building blocks in which there is no linear pipeline structure. In this unordered structure, each computed column has an optional associated parallel construct and an optional associated window construct. In this unordered form there is also a single select, and it is applied to the rows of the stream once they are computed.

At first sight it might appear that the class of stream processing computations that can be expressed as an unordered collection of building blocks will be much more limited than the class that can be expressed as a linear pipeline of building blocks. However, the class of computations that can be expressed as an unordered collection of building blocks is as extensive as in the linear pipeline case. The reasons for this are as follows:

First, although the linear model allows nested parallel constructs and the unordered model does not, any nested parallel construct can be flattened into an un-nested form. For example, if one has a parallel construct on expression2 contained inside a parallel construct on expression1, then one can flatten it into a single parallel construct on the pair (expression1, expression2).

Second, if within a linear pipeline there is a parallel construct with more than one computed column definition then one can simply replicate the parallel construct for each of the computed column definitions. For example, a parallel construct on expression 1 which contains the definitions for computed columns A and B can be rewritten as two separate parallel constructs on expression 1, one containing the definition for column A and the other containing the definition for column B.

Third, if within a linear pipeline one has a window construct with more than one computed column definition then one can simply replicate the window construct for each of the computed column definitions. For example, a window construct with alignment value a1 and duration value d1 which contains the definitions for computed columns A and B can be rewritten as two separate window constructs on a1 and d1, one containing the definition for column A and the other containing the definition for column B.

Fourth, if within a linear pipeline there are one or more select constructs spread throughout the pipeline then each of them can be replaced by a new Boolean-valued computed column that records that the row was "marked as selected" at that point. The building blocks that follow the replaced select can then be modified, if necessary, to reflect the fact that the new computed column contains the information as to whether a given row was marked as selected. In this way one can iteratively replace all selects by marker columns and modified building blocks. At the end of this process the result is a CSP with no select constructs, but with extensive marker information contained in the columns. As a post-processing step one can now select which rows should be output by the CSP based on the marker and other information in the columns. This can be done by giving a single Boolean expression for selection.

The above four points show that the class of stream processing computations that can be expressed as an unordered collection of building blocks is essentially the same as the class that can be expressed as a linear pipeline of building blocks.

Noting this correspondence between unordered collections and linear pipelines, the present invention provides a simple interface that enables CSPs to be constructed as unordered collections of building blocks. Taking the above VWAP linear pipeline as an example, the following discussion illustrates how it is represented as an unordered collection of building blocks. First, three building blocks for the input columns are illustrated below:

```
1: <inputoutputcolumn name="Company" type="string"/>
2: <inputcolumn name="Price" type="real"/>
3: <inputcolumn name="Volume" type="integer"/>
```

Next, five separate building blocks for the computed columns are shown as Columns A, B, C, D and E below:

Column A:

```
1: <internalcolumn name="A" type="real"/>
2:     <assign>
3:         <column name="A"/>
4:         <expr>
5:             <function name="convert_to_real"><column name="Volume"/></function>
6:             <op name="mul"/>
7:             <column name="Price"/>
8:         </expr>
9:     </assign>
10:
```

Column B:

```
11: <internalcolumn name="B" type="real"/>
12:     <parallel>
13:         <expr>
14:             <column name="Company"/>
15:         </expr>
16:         <window>
17:             <align>
18:             <time>
19:                 <string>2007-07-01T12:00:00Z</string>
20:             </time>
21:             </align>
22:             <duration>00:10:00</duration>
23:             <assign>
24:                 <column name="B"/>
25:                 <expr><function name="window_fill_sum_of_values"><column name="A"/></function></expr>
26:             </assign>
27:         </window>
28:     </parallel>
29:
```

Column C:

```
30: <internalcolumn name="C" type="integer"/>
31:
32:     <parallel>
33:         <expr>
34:             <column name="Company"/>
35:         </expr>
36:         <window>
37:         <align>
38:             <time>
39:                 <string>2007-07-01T12:00:00Z</string>
40:             </time>
41:         </align>
42:             <duration>00:10:00</duration>
43:             <assign>
44:                 <column name="C"/>
45:                 <expr><function name="window_fill_sum_of_values"><column name="Volume"/></function></expr>
46:             </assign>
```

Column D:

```
50: <internalcolumn name="D" type="boolean"/>
51:
52:   <parallel>
53:      <expr>
54:         <column name="Company"/>
55:      </expr>
56:      <window>
57:         <align>
58:            <time>
59:               <string>2007-07-01T12:00:00Z</string>
60:            </time>
61:         </align>
62:         <duration>00:10:00</duration>
63:      <assign>
64:         <column name="D"/>
65:         <expr><function name="window_mark_start"/></expr>
66:      </assign>
67:   </window>
68:   </parallel>
69:
```

Column E:

```
70: <outputcolumn name="E" type="real"/>
71:   <assign>
72:         <column name="E"/>
73:      <expr>
74:         <column name="B"/>
75:         <op name="div"/>
76:         <function name="convert_to_real"><column name="C"/>
         </function>
77:      </expr>
78:   </assign>
```

Lastly, there is a post-processing selection block:

```
1: <select>
2:      <expr>
3:         <column name="D"/>
4:      </expr>
5:
6: </select>
```

Note that computed columns A and E do not have the optional associated parallel and window constructs, whereas columns B, C and D have both of them. The above VWAP example shows the clear correspondence between the unordered blocks CSP representation of the present invention and the linear pipeline CSP representation. In the following discussion, the step-by-step process whereby the system of the present invention enables users to construct new CSP agents from within a spreadsheet will be described.

As soon as a user's spreadsheet is in Cloudscale-mode, the user can simply click on an icon to "Create Agent". The system will respond by presenting the user with a simple form in which the name of the agent, the start time, the end time, plus any optional map, parameter, next and pipe cells can be specified, along with an unordered list of (i) the inputs to the agent and their types, and (ii) the computed columns and their formulae. At any time the user can switch back and forth between specifying the set of inputs and the set of computed columns. In the above example, the inputs are Company, Price and Volume.

When a user clicks on the form to add or edit a computed column, the user is presented with a separate form in which the various elements of a computed column specification can be given. The following table shows one example of such a form, although other layouts and styles are possible:

| Column | Name | C |
|---|---|---|
| | Type | integer |
| Formula | | window_fill_sum_of_values(Volume) |
| Parallel | | Company |
| Window | Alignment | 2007-07-01T12:00:00Z |
| | Duration | 00:10:00 |

The set of formulae that can be entered in the form is extensible. The set might also include, for example, some or all of the functions available in an Excel spreadsheet. It might also include many other types of functions that are useful in specific areas of data processing. As noted above, the Parallel and Window sections of the form are optional and one or both may be omitted as required. For example, one might have:

| Column | Name | A |
|---|---|---|
| | Type | real |
| Formula | | Volume * Price |
| Parallel | | |
| Window | Alignment | |
| | Duration | |

Similarly, one might have the following:

| Column | Name | F |
|---|---|---|
| | Type | integer |
| Formula | | window_fill_sum_of_values(Volume) |
| Parallel | | |
| Window | Alignment | 2007-07-01T12:00:00Z |
| | Duration | 00:10:00 |

The above formula calculates the total volume for all companies in each ten-minute window and stores the value in computed column F.

Another example form is the following:

| Column | Name | G |
|---|---|---|
| | Type | integer |
| Formula | | prefix_sum(Volume) |
| Parallel | | Company |
| Window | Alignment | |
| | Duration | |

This calculates, for each company independently, the running total of all Volume values from the start of the CSP computation up to the current row.

The above examples have included examples of dynamic parallel building blocks for partitioning a stream a stream into groups during a computation, and examples of time-based window building blocks. The system of the present invention also allows static parallel building blocks for grouping and punctuation-based window building blocks in the manner described in commonly-owned, co-pending U.S. patent application Ser. No. 12/343,215, filed Dec. 23, 2008 entitled "System and Methodology for Parallel Stream Processing". For example, the following building block has a static parallel construct and a punctuation-based window construct:

| Column | Name | Diff |
|---|---|---|
|  | Type | integer |
| Formula |  | window_fill_sum_of_values(V) |
| Parallel |  | Company ["MSFT", "GOOG", "ADBE", "YHOO"] |
| Window |  | W>99999 |

Checking and Validation of CSP Formulae and Whole CSPs

Commonly-owned, co-U.S. patent application Ser. No. 12/343,215 filed Dec. 23, 2008 entitled "System and Methodology for Parallel Stream Processing" includes a description of the types of type and dependency checking that can be statically performed on CSP agents in order to detect errors in the CSP specification before it is run. Static checking of a single CSP formula can detect errors in the syntax of expressions, incorrect function names, parameter type errors and other types of problems. Static checking of a whole CSP can detect errors where a column has been referenced but not defined, and other types of problems concerning the CSP taken as a whole.

The present invention extends the existing functionality to incorporate static checking into the spreadsheet interface used to create new agents. When a formula is entered into a form, as described above, a validator program is called to check the validity of the formula. This validator program can be integrated into the spreadsheet software on the user machine, so that validation is carried out immediately and rapidly, providing instant feedback to the user while the user is still working on that form. The following example shows how these validation steps are performed using the currently preferred embodiment of the present invention:

| Column | Name | C |
|---|---|---|
|  | Type | integer |
| Formula |  | winddow_fill_sum_of_values(Volume) |
| Parallel |  | Company |
| Window | Alignment | 2007-07-01T12:00:00Z |
|  | Duration | 00:10:00 |
|  | VALIDATE | No such function "winddow_fill_sum_of_values" |

As illustrated above, an error in the function name is detected as there is no function named "window_fill_sum_of_values". After the user corrects the spelling error in the function name, the validator confirms that the function is correct as shown below:

| Column | Name | C |
|---|---|---|
|  | Type | integer |
| Formula |  | window_fill_sum_of_values(Volume) |
| Parallel |  | Company |
| Window | Alignment | 2007-07-01T12:00:00Z |
|  | Duration | 00:10:00 |
|  | VALIDATE | Computed column definition is valid |

A related interface is provided enabling the user to validate entire CSPs.

Optimization of Parallel Processing and Window Processing

As can be seen from the above VWAP example, the unordered blocks representation of a CSP may contain a number of repetitions of parallel and window constructs that would only appear once in a corresponding linear pipeline representation of the CSP. For example, the parallel construct on Company is repeated three times for computed columns B, C and D. The window construct for a ten-minute duration is also repeated three times for the same three computed columns. In certain implementations, this repetition may lead to certain inefficiencies in the execution of the CSP. To eliminate such inefficiencies, simple static analysis can again be used in order to "internally" fuse together two or more computed column specifications that share the same parallel construct, share the same window construct, or share the same parallel and window constructs. In this way one can achieve the simplicity of the unordered blocks user interface without sacrificing execution time efficiency.

This optimization of unordered block CSPs can be described as "parallel fusion" and "window fusion". It corresponds quite closely to the standard optimization method in programming language compilers of "loop fusion", where multiple loops with identical parameters but different loop bodies are combined into a single loop in order to reduce loop overhead and improve run-time performance.

Select Rows and Columns For Input To Spreadsheet

Having completed the forms specifying the input columns and computed columns, all that remains to be done in order to fully specify the CSP is to specify which rows and columns are to be output by the CSP into the spreadsheet. Again a simple form suffices. The user simply provides a single Boolean expression defining the rows that should be output, and a list of the columns that should be output. In the case of the VWAP example above the following are the output rows and output columns:

| Output Rows: | D |
|---|---|
| Output Columns: | Company |
|  | E |

Alternatively, the output rows specification can be incorporated into the main agent specification block, and the output columns specification can be incorporated into the building blocks for the associated column.

Location Control Cells for Stream Input To Spreadsheet

Having defined one or more agents as described above, the user of a spreadsheet in Cloudscale-mode is now ready to deploy and run a set of newly created or previously existing CSPs, and to coordinate, correlate and control the data from those CSPs that will stream into the spreadsheet. The first step in this process is to define the Location Control Cells for the data coming into the spreadsheet from the various CSPs.

Consider the case where a spreadsheet user at Stocksco wants to run three agents concurrently, and to stream their outputs into a model within the spreadsheet. The three agents are VWAP-TV which will run on amazon.cloudscale.com producing three output columns Company, E and G, TWAP which will run locally on stocksco.com producing two output columns Company and TW, and SENTIMENT which will run on azure.cloudscale.com producing two output columns Company and SentimentScore. To initiate this deployment, the user completes another form indicating where the Location Control Cell for each output column will be, within the spreadsheet, and its initial cell reference value. In each case, the specification is optional, and if omitted then default values will be used. For the above example, this deployment form might be as follows:

| Agent | Output Column | Location Control Cell | Initial Value |
|---|---|---|---|
| VWAP | Company | Sheet1!A5 | Sheet2!A1 |
|  | E | Sheet1!A6 | Sheet2!B1 |
|  | G | Sheet1!A7 | Sheet2!C1 |

-continued

| Agent | Output Column | Location Control Cell | Initial Value |
|---|---|---|---|
| TWAP | Company | Sheet1!A9 | Sheet3!A1 |
|  | TW | Sheet1!A10 | Sheet3!B1 |
| SENTIMENT | Company | Sheet1!A12 | Sheet5!C1 |
|  | SentimentScore | Sheet1!A13 | Sheet5!G4 |

The form indicates that when the VWAP CSP is run, the initial set of output rows for column Company will be input to the spreadsheet at cells A1, A2, A3, A4, . . . of Sheet2. The initial set of output rows for column E will be input to the spreadsheet at cells B1, B2, B3, B4, . . . of Sheet2. Similarly, when the SENTIMENT CSP is run, the initial set of output rows for column SentimentScore will be input to the spreadsheet at cells G4, G5, G6, G7, . . . of Sheet5. As in the case of the output columns specification, the Location Control Cells can be incorporated into the building blocks for the associated column.

The Location Control Cells of the present invention can be read or written by both the CSPs and the spreadsheet. They provide a simple but very flexible and powerful way of coordinating the interaction between the two parts of the system of the present invention—the stream processing systems and the spreadsheet computation. The following discussion describes how these two parts of the overall system are controlled in the currently preferred embodiment.

Manual Mode Controls for CSPs and Spreadsheet

In its currently preferred embodiment, the system of the present invention provides two forms of control—manual mode and automatic mode. A spreadsheet can only be in one mode at a time, and there can only be one instance of a mode active at any time, so before entering a new mode, the system will automatically issue a control to stop any running stream processors. In manual mode the user has four controls: Start Agents, Stop Agents, Write Data To Cloudcels, and Recalculate Spreadsheet.

Start Agents

Start Agents instructs the system to start a given set of one or more CSPs. For example, a Start Agents command could be given to start the set of three CSPs {VWAP, TWAP, SENTIMENT}. The set of three CSPs will be run concurrently as a group, although as noted above, the actual computations may take place on any combination of local machines or remote cloud computing infrastructures. The following is an example of a Start Agents control form:

| Start Agents | |
|---|---|
| Agent | Data |
| VWAP | NASDAQ_Last_Sale |
| TWAP | BATS_Last_Sale |
| SENTIMENT | Spinn3r_Blog_News_Feed |

The form indicates that: the VWAP agent should be started on Cloudscale's Amazon cloud, running on the stream of NASDAQ Last Sale data available there; the TWAP agent should be concurrently started on a local system at stocksco-.com, running on the stream of BATS_Last_Sale data available there; and finally that the SENTIMENT agent should also be concurrently started on Cloudscale's Azure cloud, running on the stream of Spinn3r_Blog_News_Feed data available there. For reasons of efficiency, it is usually convenient to have an agent run in the same location as the data it is operating on, but this is not essential.

Stop Agents

Stop Agents instructs the system to stop a given set of one or more CSPs. For example, a StopAgents command could be given to stop two of the three CSPs mentioned above.

| Stop Agents | |
|---|---|
| Agent | Data |
| VWAP | NASDAQ_Last_Sale |
| TWAP | BATS_Last_Sale |

The form indicates that the VWAP and TWAP agents should be stopped, leaving only the SENTIMENT agent running Although these two agents have been stopped, the data previously output by them will still be stored and available to be written to spreadsheet cells in the spreadsheet.

Write Data To Cloudcels

Write Data To Cloudcels instructs the system to get all new data written by the group of CSPs (including those now stopped) and write it into the spreadsheet cells ("cloudcels") specified by the values in the Location Control Cells. To illustrate in greater detail how this is performed, consider a case involving a single column in one of the agents, namely an output column G of agent VWAP. From the above table one can see that currently this output column has a Location Control Cell at Sheet1!A7 and that it currently contains the value Sheet2!C1. Assume that the Write Data To Cloudcels control is initiated and it returns with 394 new rows of output from the VWAP agent. The stream of 394 new values for the column G will be written into cells C1, C2, C3, . . . , C894 of Sheet2. On completion of this writing, the Location Control Cell at Sheet1!A7 will be updated from the value Sheet2!C1 to a new value of Sheet2!C895 to indicate that, unless otherwise modified, the next time a Write Data To Cloudcels control is initiated the new values for column G will be written into cells C895, C896, C897, . . . of Sheet2.

Since Location Control Cells can be read or written to by both CSPs and by the spreadsheet (manually or automatically), the user has complete freedom to modify the contents of a Location Control Cell at any time. For example, if the user is only interested in having the latest batch of rows from the VWAP output stream in the spreadsheet, then by simply resetting the contents of Sheet1!A5 to Sheet2!A1, resetting the contents of Sheet1!A6 to Sheet2!B1, and resetting the contents of Sheet1!A7 to Sheet2!C1 after each occurrence of a Write Data To Cloudcels command, the previous history will be erased. Other much more complex forms of control can also be achieved very simply by adjusting the contents of Location Control Cells between successive Write Data To Cloudcels operations. For example, a user can keep histories for the last 10,000,000 rows, or for the last 3 hours, or for the last 25 Write Data To Cloudcels operations.

Users who prefer to keep histories as a two-dimensional matrix, or in some other format, instead of as a one-dimensional column within the spreadsheet can also do that simply and easily. Suppose a user wanted to keep a two-dimensional history of the data written for column G of the VWAP agent over the last 15 Write Data To Cloudcels operations. To achieve this the user simply initializes the Location Control Cell for column G at Sheet1!A7 to the value Sheet2!C1 and then after successive Write Data To Cloudcels operations, resets the value of the cell Sheet1!A7 first to Sheet2!D1, then to Sheet2!E1, . . . , to Sheet2!Q1, then back to Sheet2!C1 and repeats the cycle. This kind of data formatting can also be automated so that the user only needs to specify a keyword in the associated building block for the column.

Recalculate Spreadsheet

The final manual mode control provided in the presently preferred embodiment is Recalculate Spreadsheet, which instructs the system to recalculate the values in the spreadsheet using the normal Excel recalculate mechanism.

Recalculation enables the latest data from each of the CSPs to be coordinated, correlated, synchronized and combined in order to gain insight into complex events that could not be detected and understood by the various CSPs acting in isolation. For example, recalculation enables models to be built that can correlate real-time insights into market data streams with related real-time insights from blogs and news streams, as described earlier. It also enables the kind of intelligent correlation across clickstream and network data described above, and many other types of intelligent real-time complex event processing applications.

During this recalculation process the values in the various Location Control Cells can be programmatically updated if required. For example, the spreadsheet can contain the simple logic required to automatically perform the process described in the last section to produce a two-dimensional history of the data written for column G of the VWAP agent over the last 15 Write Data To Cloudcels operations.

Automatic Mode Controls for CSPs and Spreadsheet

In addition to manual mode, the system of the present invention also provides an automatic mode. In automatic mode the user currently has three controls: Set Delay Time, Start Cycle, and Stop Cycle.

In automatic mode, the system, once started, operates in a continuous cycle until stopped. Relating it to the manual mode controls described above, one can think of the system in automatic mode as operating in the following manner where each step completes before the next one begins:

```
 1: Start Agents
 2: Wait n seconds
 3: Write Data To Cloudcels
 4: Recalculate Spreadsheet
 5: Wait n seconds
 6: Write Data To Cloudcels
 7: Recalculate Spreadsheet
 8: Wait n seconds
 9: Write Data To Cloudcels
10: Recalculate Spreadsheet
11: Wait n seconds
12: Write Data To Cloudcels
13: Recalculate Spreadsheet
14: Stop Agents
```

In the example shown above there are four cycles, but the number of cycles might be four million, or the process may continue indefinitely. Although it is convenient to think in terms of each step completing before the next one begins, it may operate in a slightly different way in order to achieve higher levels of efficiency. For example, the delay time "n seconds" could be set to zero (i.e., no delay). Moreover the first part of the Write Data To Cloudcels operation, in which data is retrieved from the CSPs might actually be run concurrently with the Recalculate Spreadsheet operation, so long as the data is not actually written into the spreadsheet cells while the Recalculation is in progress.

The three controls for automatic mode provided in the presently preferred embodiment are relatively simple.

Set Delay Time:

Set Delay Time may be used to specify the number of seconds that the system should wait after a Recalculate operation before retrieving the next batch of data from the CSPs. Setting a delay time that is too short may be inefficient in that much effort and cost may be devoted to polling for new data, and very little data may be retrieved each time. Setting a delay time that is too long may mean that an important event is not detected as early as it could be, and the opportunity to act on that information may be lost.

Start Cycle:

Start Cycle instructs the system to start the set of agents and then to repeatedly cycle through the Delay-Write-Recalculate operations continuously.

Stop Cycle:

Stop Cycle instructs the system to stop the set of agents, and to terminate the cycle after the next Recalculate Spreadsheet operation has completed.

Offline Stream Processing

As in other areas of computing, it is often convenient to be able to temporarily "go offline" (i.e., to disconnect from some computational activity). In the case of the present invention, it is important to be able to allow users to initiate a set of CSPs, for example running in multiple clouds, and then to be able to disconnect the spreadsheet and then reconnect later to pick up where the data processing was temporarily suspended.

The system of the present invention decouples the two parts of the system, enabling this kind of offline stream processing. The CSPs, once started will continuously output a sequence of files. As noted above, each file contains a section of the SCF stream output by the CSP. The stream of files can be written to whichever type of file system is most appropriate. For example, it can be written to a local file system, to a network file system, or to a cloud-based storage system such as the Amazon Simple Storage Service (Amazon S3) or Microsoft's Azure storage services as previously described.

In addition to outputting a stream of output data files for each CSP, the CSP can also be set to regularly output a checkpoint of the live state of the CSP computation. As in the case of the output data files, the checkpoint file can be written to a local file system, to a network file system, or to a cloud-based storage system.

A spreadsheet in Cloudscale-mode can be suspended for a whole variety of reasons. For example, the machine on which the spreadsheet is running may experience a hardware or software failure, or experience a loss of network connectivity, or the user might need to turn off the spreadsheet in order to travel. In such cases, the system of the present invention will resume and reconnect as soon as the spreadsheet is able to connect again to the various CSPs that it had left running The sequence of data files output by the CSPs during the period of suspension will be immediately available and the system can continue normally.

Leases

Leases have become a standard means of resource allocation in distributed systems. Leases enable resources to be allocated to a process P in a way that avoids having that resource become unavailable to any other process in a situation where process P dies, or experiences some other problem which stops it from communicating with the rest of the distributed system in order to relinquish the resource.

In the currently preferred embodiment of the present invention, leases are used to resolve situations where CSP computations have been initiated, but due to some problem or some oversight, those computations have not been terminated when they should have been. For example, suppose a spreadsheet user in Cloudscale-mode initiates two CSPs—VWAP on amazon.cloudscale.com, and SENTIMENT on azure.cloudscale.com. After some period of time, the user has completed the required analysis and terminates the spreadsheet, but forgets to first stop the two CSP agents. In such a case it will be unclear whether or not this has been a mistake. It may actually be a deliberate decision in which the user has decided to go offline and to reconnect to the stream processing outputs later, as described above. The lease mechanisms of the present invention provide a simple and powerful solution to this problem.

When a set of CSP agents are started they are given a lease time of some default fixed length, for example, a lease of time of one hour. This default lease length is a system-level parameter. It might be set at one hour, one day or any other length of time as appropriate. The lease rules of the system state that a CSP computation will be run for no more than the length of the current lease, but that a user may explicitly request an extension or a reduction of a lease at any time.

Consider the two scenarios described above. In the first, user A starts two agents, carries out some analysis, goes offline, returns, resumes analysis from the previous point. In the second, user B starts two agents, carries out some analysis, completes the analysis, terminates the spreadsheet, but mistakenly fails to terminate the two running agents.

In the first case, user A starts with a default one-hour lease for the two agents. During the initial analysis, user A repeatedly renews the one-hour lease each hour until there is a need to temporarily go offline. At that point, the user extends the lease to 72 hours and disconnects the spreadsheet from the system. After 54 hours, user A returns and restarts the spreadsheet, which immediately connects to the CSPs and writes the values from the previous 54 hours into the spreadsheet. Having resumed normal operation, user A can now reduce the lease back to one hour or some other more appropriate length. The lease mechanism of the present invention has enabled user A to go offline with no risk and no wasted resources.

In the second case, user B also starts with a default one-hour lease and renews it regularly while carrying out the analysis. When user B terminates the spreadsheet there will be some period less than one hour remaining on the lease, and as soon as that time period has expired the two CSP agents will be automatically terminated. In this case, the lease mechanism of the present invention has enabled user B to avoid consuming resources unnecessarily for an indefinite period of time. If user B is being charged for those resources, for example, by an organization offering the service, then the lease mechanism may save user B significant unnecessary expenditure.

Automated Launching of Multiple Agents

In many cases, a user will wish to launch many agents in order to carry out a large-scale data processing task. The present invention provides several mechanisms within the spreadsheet to automatically control the launching of multiple agents. The mechanisms are Map Parallelism, Parametric Parallelism, Next, and Pipe. These various automation mechanisms can be described using the above VWAP example, in which the Volume Weighted Average Price for each company is calculated for every ten-minute window, aligned at 12 noon.

Where a user needs to run the VWAP agent on a small volume of data, for example on two hours of data, then a single agent may suffice. If instead, the user needs to run the VWAP example on 2000 hours of data, then the user may wish to speed up the data processing by launching many tens or hundreds of agents concurrently on disjoint time intervals. The present invention enables this by simply setting a special cell in the agent specification cell—the Map cell—to an appropriate number of minutes. The default value for the Map cell is zero, which implies that, in this case, a single agent should be run on the whole 2000 hours of data. If instead the user sets the Map cell to 300, then the task will be automatically partitioned into disjoint tasks of length 300 minutes (i.e., 5 hours). The effect is that, instead of one agent, there will be 400 agents running concurrently, each one of which will be processing a separate 5-hour interval of the data.

Parametric parallelism provides a quite different form of automation. The user may need to run the VWAP example on two hours of data, but may need to know the previous 10-minute Volume Weighted Average Price for each successive minute, i.e. aligned not just at 12 noon, but also separately aligned at 12:01, 12:02, . . . , 12:09. The present invention enables this by allowing any formula or cell value to contain a parameter, and allowing the agent specification to contain a description of the spreadsheet cell locations where the various values for the parameters can be found. For example, instead of the Alignment formula being given as 2007-07-01T12:00:00Z, it can be given as 2007-07-01T12:$A:00Z. The Parameter cell in the agent specification block can then be set to A10:A19 and the values in those spreadsheet cells can be set to 0, 1, 2, . . . 9. The system will then launch ten separate concurrent agents, each one computing a 10-minute VWAP calculation on the two hours of data, but with ten different alignments.

The above example of parametric parallelism has only a single parameter, but the present invention permits any number of parameters to be used. For example, consider an agent with two parameters P and Q. If the Parameter cell has the value P8:Q12 and the values in those ten cells are 2, 7, 5, 7, 11 (P8:P12) and "A", "L", "M", "B", "A" (Q8:Q12) then the system will launch five separate concurrent agents, corresponding to the five rows in the rectangle of values (e.g., one of the agents will have P=5, Q="M"). This description utilizes the syntactic conventions for parametric parallelism in Excel, where columns are identified by letter strings. For other spreadsheets, different syntactic conventions can be used based on the way in which columns, rows and cells are referenced.

The present invention enables two further forms of automation for the launching of multiple agents—Next and Pipe. The assignment block contains a Next cell which can be used to control the sequence in which a number of agents are launched. Consider an example where SHEETS 1, 2 and 3 of the spreadsheet contain the specifications for agents A, B and C respectively. If the Next cell in the assignment block on SHEET1 is set to SHEET3, the Next cell on SHEET3 is set to SHEET2, and the Next cell on SHEET2 is left empty, then if agent A is launched, it will be automatically followed by agent C and then by agent B. A further optional refinement of the Next cell mechanism of the present invention is that it can be further specified that the data stream output from one agent can be used directly as the input stream to another agent. For example, the output from agent A can be used directly as the input stream for agent C.

Dashboards and Visualization

One of the most important advantages of data processing using a spreadsheet is the ability to use the wide array of dashboard and visualization tools that are available to spreadsheet users. For widely used spreadsheets such as Microsoft Excel there are a number of powerful dashboard and visualization tools available from Microsoft Corporation and other companies. The present invention enables users to take advantage of all these powerful tools in order to visualize and monitor the data coming into the spreadsheet continuously from any number of stream processing systems spread across some combination of local computing architectures and remote cloud computing platforms.

Collaborative Data Processing

Another important advantage of data processing using a spreadsheet is the ability to use the various collaboration and sharing tools that are available to spreadsheet users. For widely used spreadsheets such as Microsoft Excel there are a number of powerful collaboration and sharing tools available from Microsoft Corporation and other companies, including Microsoft SharePoint from Microsoft Corporation. Similarly Google, Inc. offers Google Spreadsheets, and recently announced its Google Wave platform that would enable collaboration amongst Google Spreadsheets users. Google, Inc. has also recently introduced its Google Fusion Tables service for spreadsheet collaboration. The present invention enables users to take advantage of all these powerful tools in order to collaborate effectively by sharing the data coming into the spreadsheet continuously from any number of stream processing systems spread across some combination of local computing architectures and remote cloud computing platforms.

DETAILED OPERATION

Figure 3A:
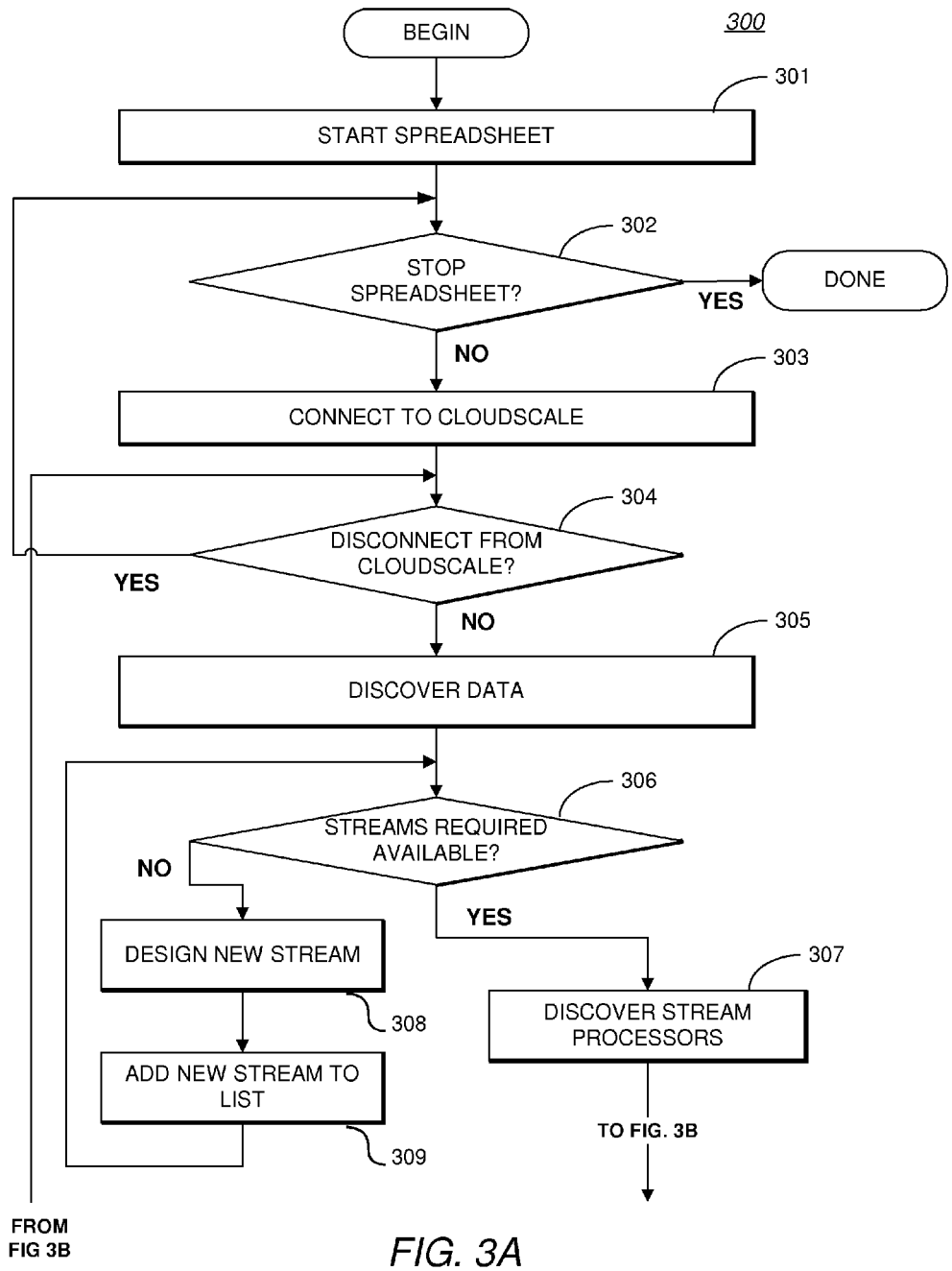
FIGS. 3A-B comprise a single flowchart depicting the flow of activities involved in performing some sample operations using the system of the present invention.

The operations of the system of the present invention may be illustrated by example. For instance, FIGS. 3A-B comprise a single flowchart 300 depicting the flow of activities involved in performing an example set of operations using the system of the present invention. In the example flowchart 300, some activities are shown as being carried out in a particular order, for example, discover data before discover stream processors. However, those skilled in the art will appreciate that many other possible orders are possible. For instance, the user might choose to discover stream processors before discovering data in certain circumstances.

The process begins at step 301 when the user starts the spreadsheet. For example, the user might start Microsoft Excel on a Windows Personal Computer. When the user eventually stops the spreadsheet at step 302, the process concludes.

At step 303, the user chooses to connect to Cloudscale. After the user has logged in and been authenticated, the spreadsheet is put into Cloudscale-mode as previously described, enabling the user to take advantage of the functionality embodied in the system of the present invention. When the user eventually disconnects from Cloudscale at step 304, the Cloudscale-mode of the spreadsheet is terminated and the spreadsheet returns to normal mode.

At step 305, the user chooses to discover data, and the system of the present invention responds by providing a detailed description of the various data sources available. If the stream(s) required is not immediately available as determined at decision step 306, the user can, at steps 308 and 309, design a new stream and add that new stream to the list of those available.

Figure 3B:
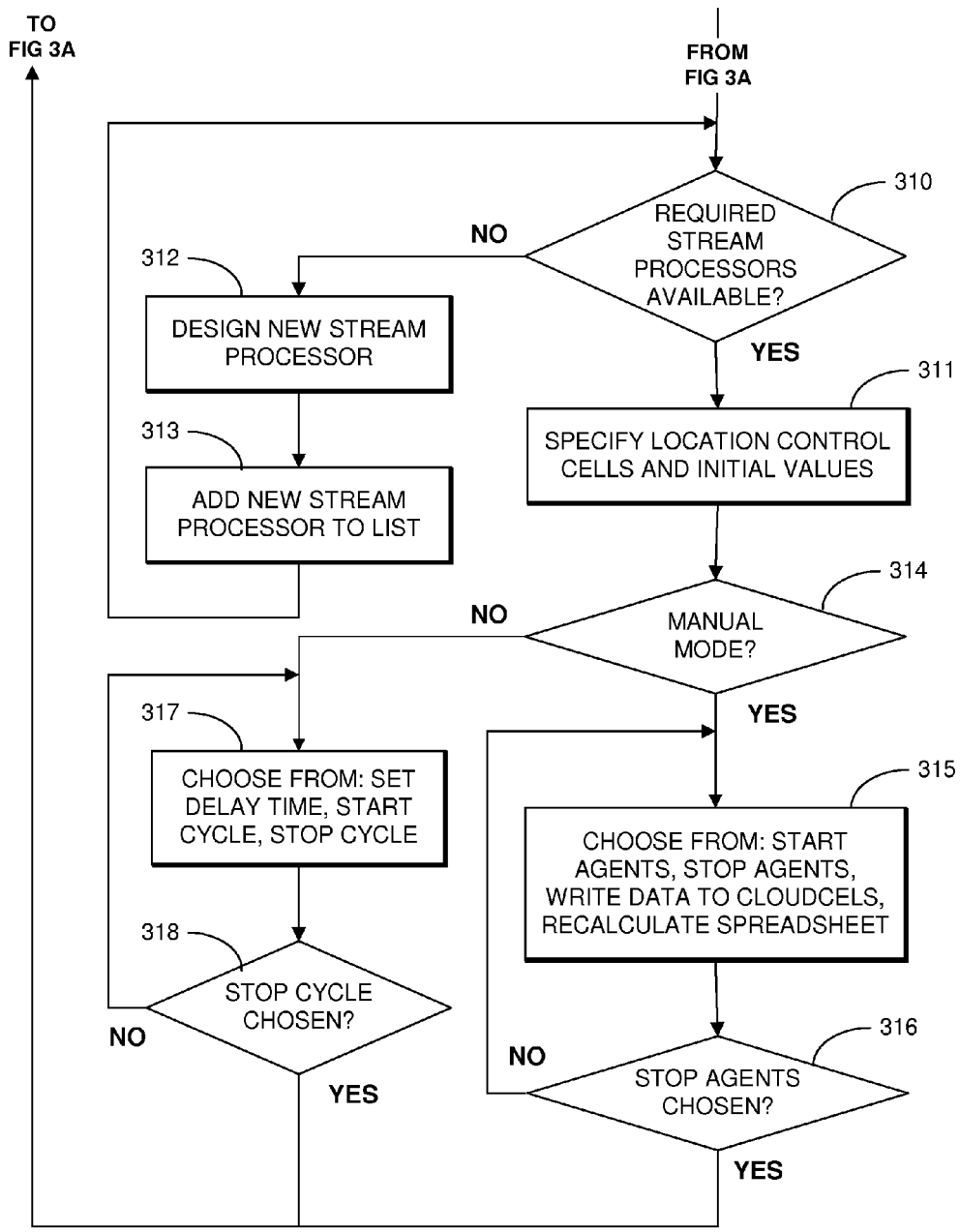

If the stream is available at step 306, then at step 307, the user may elect to discover stream processors, and the system of the present invention responds by providing a detailed description of the various stream processors that are already available. If the stream processor(s) required is determined not to be immediately available at decision step 310 as shown at FIG. 3B, the user can, at steps 312 and 313, design one or more new stream processor(s) and add the new stream processor(s) to the list of those available.

If one or more streams and one or more stream processor are available as a result of the foregoing steps, the user can now prepare to deploy and run a set of set of stream processors, and to coordinate, correlate and control the data from those processors that will stream into the spreadsheet. At step 311, the user specifies the Location Control Cells (LCCs) for the data coming into the spreadsheet from the various processors, and gives the initial values for the various LCCs.

The system is now ready to run the stream processors and the user may choose whether to run the specified set of stream processors in manual mode or in automatic mode. In the currently preferred embodiment, a spreadsheet can only be in one mode at a time, and there can only be one instance of a mode active at any time, so before entering a new mode, the system will automatically issue a control to stop any running stream processors.

As illustrated at decision step 314, if the user elects manual mode, the process proceeds to steps 315-316; otherwise, it proceeds to steps 317-318 if in automatic mode. In manual mode the user has four controls available in the currently preferred embodiment as shown at step 315: Start Agents, Stop Agents, Write Data To Cloudcels, and Recalculate Spreadsheet. Start Agents instructs the system to start a given set of one or more stream processors. Stop Agents instructs the system to stop a given set of one or more stream processors. Write Data To Cloudcels instructs the system to get all new data written by the group of stream processors (including those now stopped) and write it into the spreadsheet cells ("cloudcels") specified by the values in the Location Control Cells. Recalculate Spreadsheet instructs the system to recalculate the values in the spreadsheet using the normal recalculate mechanism. Recalculation enables the latest data from each of the stream processors to be coordinated, correlated, synchronized and combined in order to gain insight into complex events that could not be detected and understood by the various stream processors acting in isolation. At step 315-316, the user can repeatedly choose one of the four controls. Once a Stop Agents control is chosen, the user can return to step 304 as shown at FIG. 3A and start over again with a new stream processing task using the system of the present invention.

In automatic mode, the system, once started, operates in a continuous cycle until stopped. Currently three controls are made available to the user: Set Delay Time, Start Cycle, and Stop Cycle. At steps 317-218, the user can choose to modify the delay time from the default value, to start an automatic cycle, or to stop a cycle that is running Once a cycle is stopped, the user can return to step 304 and start over again with a new stream processing task using the system of the present invention.

Spreadsheet Plug-In for Excel

The following code sample provides a high level overview of the operation of the currently preferred embodiment of the Cloudscale Plug-In for Microsoft Excel and its deployment to provide a Cloudscale-enabled spreadsheet:

```
 1: namespace CloudscaleAddIn
 2: {
 3:
 4: /// <summary>
 5: ///   Using Add-in Express to create Add-in Module
 6: /// </summary>
 7:
 8: public class AddinModule : AddinExpress.MSO.ADXAddinModule
 9: #region Component Designer generated code
10: #region Add-in Express automatic code
11: [ComRegisterFunctionAttribute]
12: public static void AddinRegister(Type t)
13: { AddinExpress.MSO.ADXAddinModule.ADXRegister(t); }
14: [ComUnregisterFunctionAttribute]
15: public static void AddinUnregister(Type t)
16: {    AddinExpress.MSO.ADXAddinModule.ADXUnregister(t); }
17: public override void UninstallControls( )
```

-continued

```
18: {    base.UninstallControls( ); }
19:
20: /// <summary>
21: ///   Define the ExcelApp and data structures
22: /// </summary>
23:
24: public Excel._Application ExcelApp {...}
25:
26: /// <summary>
27: ///   Define the user interface and code to interact with
28: ///   the CSP
29: /// </summary>
30:
31: public partial class CS_Authenticate : Form { ... }
32:
33: private void adxCloudButton_OnClick(object sender,...) { ... }
34:
35: ///   Parser for the CSP Agent Language producing XML
36: ///   safe code for the CSP
37:
38: protected Tree Parse(string expression) {...}
39:
40: /// Sending the Generated XML Agent Code to the CSP
41:
42: private int savetocloud(string filename,string filetype) { ... }
43:
44: ///   Start cloud computations from Excel UI
45:
46: private void Start_Cloud_Apps_OnClick(object sender,...) {...}
47:
48: /// Interaction with the cloud computations from Excel ///    UI
49:
50: private void Start_Continuous_cycle_OnClick(object sender,...) {...}
51:
52: private void Resume_Continuous_cycle_OnClick object sender,...)
{...}
53:
54: ///   Code for getting data from the CSPs to AddIn
55:
56: private void Get_Cloud_Data_OnClick(object sender ...) {...}
57:
58: ///   Transferring the results into Excel defined cells
59:
60: private void checkForNewSprayPoints( ) {...}
61:
62: ///   Manually triggering Excel to recalculate values
63:
64: private void Recalculate_Excel_OnClick(object sender...){...}
65:
66: }
67:
68: ///     Code for Creating the Windows Setup files for the ///    AddIn
69: namespace CloudscaleAddInSetUp
70: {
71: private void DetectDependencies( );
72: private void CreateSetUpFile( );
73: }
```

Although the above sample code illustrates the Cloudscale Plug-In for Excel, those skilled in the art will appreciate that it may be adapted to work in conjunction with other spreadsheet applications, as desired.

Figure 4:
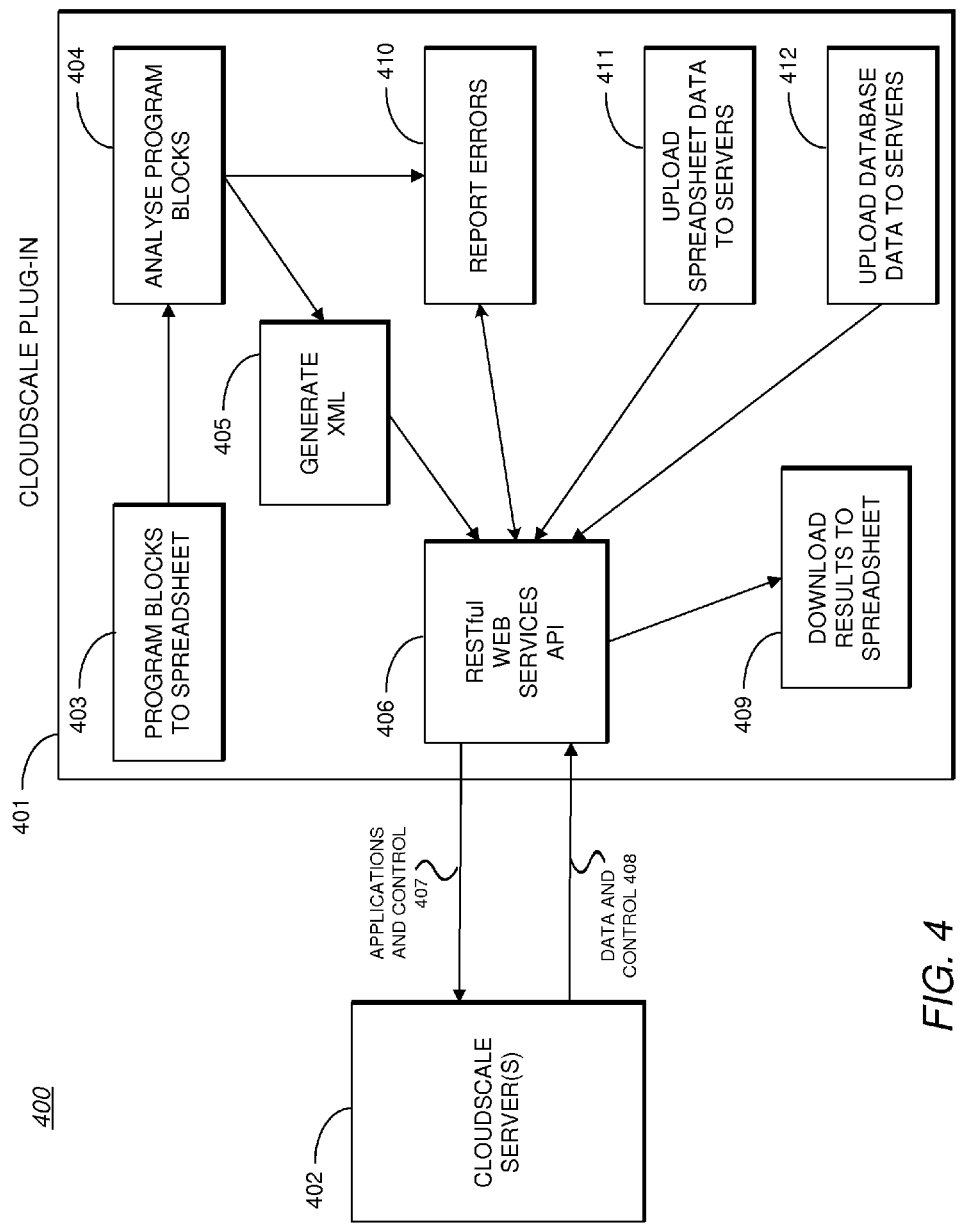
FIG. 4 is a block diagram illustrating the operations of the Cloudscale Plug-In and interaction with Cloudscale Server(s).

FIG. 4 is a block diagram 400 illustrating the operations of the Cloudscale Plug-In 401 and interaction with Cloudscale Server(s) 402 in further detail. Block diagram 400 illustrates certain components of the system of the present invention and the flow of some of their operations. It should be noted that although in the flow of operations depicted at FIG. 4 some activities are shown as being carried out in a particular order, those skilled in the art will appreciate that many other possible orders for performing such operations are possible.

As shown at FIG. 4, the Cloudscale Plug-In 401 interacts with one or more Cloudscale Server(s) 402 using a RESTful Web Services API 406 in which applications and control information are sent to the servers as provided at 407 and data and control information is sent back from the servers as provided at 408.

Once the Cloudscale Plug-In 401 is installed, the user can drop application, input and formula blocks into the spreadsheet as provided at 403 to create a Cloudscale application. The system guides the user through the process of block selection, enabling the user to produce a coherent set of blocks in the spreadsheet. The user fills in the cell information required in each of the blocks in order to specify the details of the application. The system also reports errors when a user makes a mistake, e.g. when blocks are given the same name, or when cells needing data are left empty.

Once the set of blocks have been added to the spreadsheet, the user instructs the system to execute the application. In response, the Cloudscale Plug-In 401 begins by analyzing the set of blocks as shown at 404 at FIG. 4. If any errors are found these are reported to the user as provided at 410. Otherwise, an XML representation of the well-formed application is generated as shown at 405 at FIG. 4. This well-formed application is passed to the Cloudscale Servers 402 for execution via the (RESTful) Web Services 406. If the Cloudscale Servers 402 detect any runtime errors in the application, those are reported back to the user as provided at 410 via the Web Services API 406. Otherwise, the application executes correctly and produces the required output data. The servers store the data, but may also send data back to the spreadsheet for display in a plurality of output modes supported by the Plug-In as illustrated at 409 at FIG. 4.

The user can also upload data from any spreadsheet as provided at 411, or from a database as provided at 412, to the Cloudscale Servers, via the Web Services API 406.

ALTERNATIVE EMBODIMENTS

One important commercial embodiment of the present invention is as a realtime data warehouse system. Existing data warehouses from companies such as Teradata of Dayton, Ohio, provide a means of analyzing large volumes of data, but they usually have associated latencies of hours or days. In contrast, the solution provided by the present invention can be used to construct a realtime data warehouse in which users can interactively analyze large volumes of data in realtime using a spreadsheet, with latencies of only a few seconds.

Today there are a large number of free and commercial spreadsheet products available, including Microsoft Excel from Microsoft Corporation, Google Spreadsheets from Google, Inc., OpenOffice.org Calc from Sun Microsystems (and contributors), open source Gnumeric, and Numbers from Apple Computer, Inc. Of these, Microsoft Excel is by far the most widely used. As previously discussed, the above description of the currently preferred embodiment of the present invention describes an implementation in which the spreadsheet is Excel, but another spreadsheet may be used as desired.

The above description also indicates that the stream processing systems utilized are Cloudscale Stream Processors. However, the present invention may alternatively be implemented using other types of stream processing systems. For example, many hardware and software systems for high performance supercomputing can be used to produce huge streams of data. For example, software systems such as Hadoop or Amazon Elastic MapReduce can be used to generate large volumes of streaming data. Database systems, such as Oracle, IBM DB2, Microsoft SQL Server, MySQL and others, can also be used to produce huge streams of data. Software applications written in standard programming languages such as Java, C, C++ and C# can also generate high volume data streams. The present invention provides a powerful framework for coordinating, synchronizing, correlating and integrating the outputs of such high performance systems from within a spreadsheet. In such a use of the present invention, however, it would not generally be possible to take full advantage of the powerful features of the invention that permit users to easily design the stream processing systems as an unordered collection of simple building blocks. When used with Cloudscale Stream Processors, or with a similar type of stream processing system, the present invention is able to fully exploit this powerful capability.

In the above discussion, several examples are provided of components of a specific embodiment of the invention, however, those skilled in the art will understand that the present invention can be realized in various other ways. For example, in the above description of a specific embodiment, the data discovery process results in the user being shown a list of available streams with Name, Format and Location. In an alternative embodiment, the user might also be shown a sample of each data stream, for example, the first ten rows. The user might be shown the list in a separate window outside the spreadsheet cell structure itself, or shown the list as values within an array of cells within the spreadsheet. Similarly, in the above description, the CSP discovery process results in the user being shown a list of available CSPs with Agent Name and Description. In an alternative embodiment, the user might also be shown a much more detailed description of the building blocks of the agent. Again, the user might be shown the list in a separate window outside the spreadsheet cell structure itself, or shown the list of agents as values within an array of cells within the spreadsheet.

There are a number of other areas where the above description of one specific embodiment of the invention is simply one of a number of possible embodiments. For example, each of the following components of the agent design and deployment process can be done directly within an array of cells within the spreadsheet itself, rather than outside the cells in a separate mechanism, for example a Software Wizard, with hidden internal data structures: CSP design process; selecting rows and columns for input to spreadsheet, specifying Location Control Cells for stream input to spreadsheet; manual and automatic mode controls for CSPs and spreadsheet. By explicitly representing all of these components directly within the spreadsheet cells themselves, for example, as uninterpreted text, the present invention enables all aspects of a data processing application built using the present invention to be easily communicated to any other person who has the spreadsheet software available, even if they do not have the system of the present invention available. This type of embodiment offers an improved means of collaboration between members of a team working on related data processing applications. Users can, for example, save the state of their Cloudscale environment in the standard Excel format and pass it to other Excel users if desired. Any such user would then be able to read the Cloudscale worksheets even if they do not have the spreadsheet plug-in components of the present invention that would enable them to take full advantage of the many features available within a Cloudscale-enabled spreadsheet.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention. For instance and without limitation of the foregoing, the present invention can be implemented as a system of hardware and software offered commercially as a product for purchase, or may be offered for use as an online cloud computing service. The systems and methods described herein can be implemented in hardware, software, or a combination of hardware and software. The invention can also be directly embedded in a computer program or system in order to carry out the methods and functions of the invention for that program or system.

What is claimed is:

1. A system for processing of data streams, the system comprising:
    at least one computer system including at least a processor and memory;
    at least one stream processing module that receives one or more input data streams and produces one or more output data streams, wherein each of the input data streams and output data streams are a time-ordered group of files concatenated together;
    a spreadsheet module that repeatedly performs a two-step cycle in which during the first step, the output data streams produced by said at least one stream processing module are entered into particular spreadsheet cells of a spreadsheet, and then in the second step, the spreadsheet module calculates values in the spreadsheet based on the output data streams entered into particular spreadsheet cells of the spreadsheet during the first step of the cycle; and
    a plug-in module to said spreadsheet module enabling a user to:
        design said at least one stream processing module utilizing the spreadsheet module, and
        select data for processing by said at least one stream processing module,
    wherein the plug-in module specifies rows and columns of the output data streams produced by said at least one stream processing module, enters the output data streams into particular spreadsheet cells of the spreadsheet, and performs calculations by the spreadsheet module on the output data streams entered into the particular spreadsheet cells of the spreadsheet,
        wherein said at least one stream processing module is external to the spreadsheet and the plug-in module.

2. The system of claim 1, wherein said at least one stream processing module performs static and dynamic parallel processing of said one or more input streams of data.

3. The system of claim 1, wherein said at least one stream processing module performs selected ones of time-based and punctuation-based window processing of said one or more input streams of data.

4. The system of claim 1, wherein said at least one stream processing module is designed from a set of building blocks in which each building block is associated with one or more spreadsheet cells of the spreadsheet.

5. The system of claim 4, wherein said set of building blocks can be constructed in any order.

6. The system of claim 4, wherein said at least one stream processing module is designed without requiring any ordering on the building blocks, or any other additional structuring or control flow.

7. The system of claim 4, wherein a building block comprises an input block corresponding to an input column of an input stream of data.

8. The system of claim 4, wherein a building block comprises an assignment block corresponding to a column of an input stream of data defined by a formula.

9. The system of claim 8, wherein said assignment block has an optional parameter specifying parallel processing on groups.

10. The system of claim 8, wherein each assignment block has an optional parameter specifying window processing.

11. The system of claim 1, wherein said at least one stream processing module is controlled through user interaction with the spreadsheet module, including controls for starting and stopping processing of one or more input streams of data by said at least one stream processing module.

12. The system of claim 11, wherein the user may specify a time period for performance of said two-step cycle using the spreadsheet module.

13. The system of claim 12, wherein the time period for performance of the two-step cycle can be specified using selected ones of manual start controls, setting a specific time period for performance of the cycle, and setting the cycle to be performed as fast as possible.

14. The system of claim 1, wherein said plug-in module enables a user to select a first subset of one or more of said at least one stream processors for which processing of input streams of data is to be stopped and later resumed, while specifying another subset of one or more of said at least one stream processing modules that are to continuing to process input streams of data while the first subset is inactive.

15. The system of claim 1, wherein said at least one stream processing system processes said one or more input streams of data for a period of time specified by user input using the spreadsheet module.

16. The system of claim 15, wherein the period of time for during which said at least one stream processing module continues to process input streams of data is governed by a finite-term lease that may be renewed, reduced or extended by the user at any time using the spreadsheet module.

17. The system of claim 1, wherein said one or more input streams of data to said at least one stream processing module comprise live data streams and are processed by said at least one stream processing module in real-time.

18. The system of claim 1, wherein said one or more input streams of data to said at least one stream processing module is of a plurality of forms including selected ones of live time-ordered data streams, stored time-ordered data streams, and unordered tables of data.

19. The system of claim 1, wherein said at least one stream processing module includes one or more stream processing modules provided as cloud computing services, wherein said one or more input streams of data are processed by said one or more stream processing modules remotely from the spreadsheet module by the cloud computing services.

20. The system of claim 19, wherein processing of input streams of data is carried out by a plurality of stream processing modules provided as cloud computing services on a plurality of distinct cloud computing architectures.

21. The system of claim 20, wherein said plurality of distinct cloud computing architectures include public external cloud architectures and private internal cloud architectures.

22. The system of claim 1, wherein the spreadsheet module graphically displays results of calculating output data produced by said at least one stream processing module as input into particular spreadsheet cells of the spreadsheet module.

23. The system of claim 1, wherein the spreadsheet module provides connectivity to other systems and users for collaborative data processing.

\* \* \* \* \*